(12) United States Patent
Pramod

(10) Patent No.: US 11,736,048 B1
(45) Date of Patent: Aug. 22, 2023

(54) FEEDFORWARD CURRENT CONTROL FOR DUAL WOUND SYNCHRONOUS MOTOR DRIVES

(71) Applicant: Steering Solutions IP Holding Corporation, Saginaw, MI (US)

(72) Inventor: Prerit Pramod, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

(21) Appl. No.: 17/719,944

(22) Filed: Apr. 13, 2022

(51) Int. Cl.
| | |
|---|---|
| *H02P 8/00* | (2006.01) |
| *H02P 21/08* | (2016.01) |
| *H02P 21/22* | (2016.01) |
| *B62D 5/04* | (2006.01) |
| *H02P 25/22* | (2006.01) |

(52) U.S. Cl.
CPC .............. *H02P 21/08* (2013.01); *B62D 5/046* (2013.01); *B62D 5/0409* (2013.01); *H02P 21/22* (2016.02); *H02P 25/22* (2013.01); *H02P 2207/05* (2013.01)

(58) Field of Classification Search
CPC .......... H02P 21/08; H02P 21/22; H02P 25/22; B62D 5/046; B62D 5/0409
USPC .......................................................... 318/696
See application file for complete search history.

(56) References Cited

U.S. PATENT DOCUMENTS

| | | | | |
|---|---|---|---|---|
| 2010/0176733 A1* | 7/2010 | King | ................... | H05B 47/175 315/210 |
| 2011/0050140 A1* | 3/2011 | Sakai | ................ | H02M 7/53873 318/400.36 |

* cited by examiner

*Primary Examiner* — Erick D Glass
(74) *Attorney, Agent, or Firm* — Dickinson Wright PLLC

(57) ABSTRACT

A method of controlling a dual-wound synchronous machine includes: determining positive and negative virtual half-motor current commands based on first and a second motor current commands associated with the first and second winding sets; calculating positive and negative final voltage commands based on the virtual half-motor current commands, and using first and second sets of gain factors; and commanding, based on the final voltage commands, inverters to apply an output voltage to each of two winding sets and thereby causing output currents to be generated herein. The output currents each have a d- and q-axis components, and at least one of the first set of gain factors and the second set of gain factors is configured to cause the d-axis component and the q-axis component of the first output current to be decoupled from variations of d-axis and q-axis components of the second output current.

20 Claims, 14 Drawing Sheets

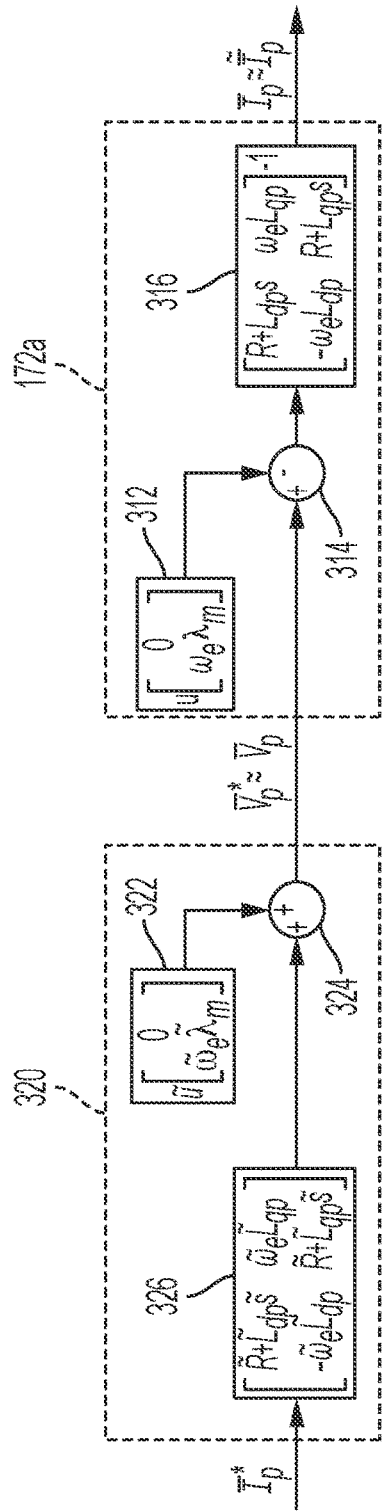
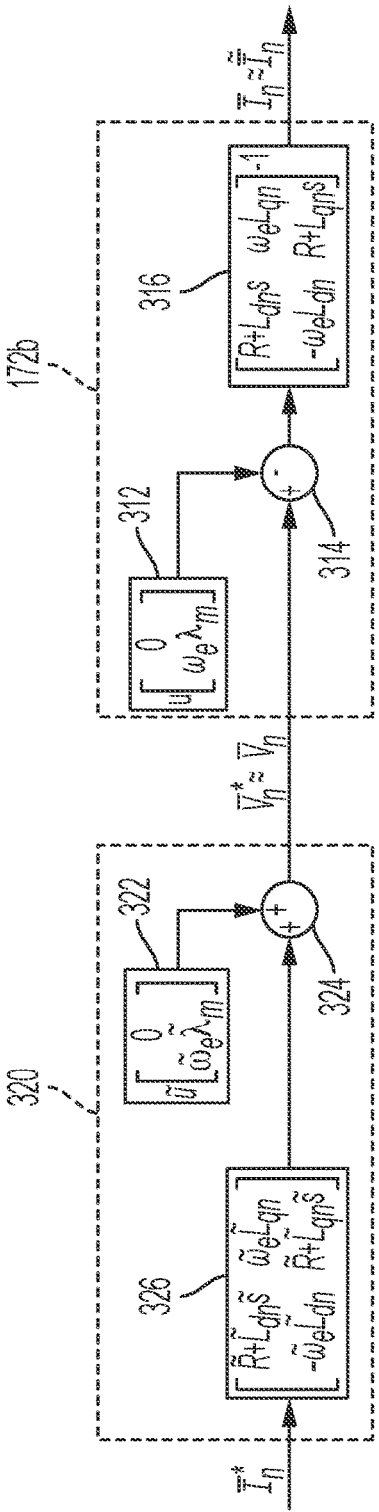
FIG. 10A
FIG. 10B

FEEDFORWARD CURRENT CONTROL FOR DUAL WOUND SYNCHRONOUS MOTOR DRIVES

BACKGROUND OF THE INVENTION

Dual wound synchronous machines, also called dual winding synchronous machines, are electric machines with two electrically independent sets of stator windings. Such dual wound synchronous machines may be used as motors, generators, or as motor/generators. Each set of stator windings may function independently as a corresponding half-motor and may be powered by a corresponding inverter. Such dual wound motors may be used in a variety of applications and can provide redundancy for safety-critical applications to allow continued operation in the event of a loss of one of the sets of stator windings and/or one of the inverters.

Dual wound synchronous machines, including dual wound permanent magnet synchronous machines (DW-PMSMs), inherently have electromagnetic (inductive) coupling between the two sets of stator windings (i.e., coupling between electrical circuits due to induction caused by magnetic fields generated as a result of the currents flowing through each of the two sets of stator windings). This induction results in a dependence of the currents, and thus torque, produced by the two winding sets of the dual wound machine. The extent or significance of this coupling depends on the specific design of the electric machine and particularly on specific features of the design including, but not limited to, stator slots, rotor poles, placement of magnets and winding configuration.

Conventional applications utilizing DW-PMSMs do not typically consider the inductive coupling between the two half-motors as significant and the resulting hardware topologies of the electric motor drive system as well as the control algorithms employed therein produce sub-optimal performance.

Torque control of DW-PMSMs is typically performed indirectly via current control, which may be implemented as a closed-loop feedback current control system employing current regulators acting on current measurements, or as a feedforward current control system utilizing an inverse mathematical model of the machine. The effect of the inductive coupling on the overall current, and thus torque, control performance of the motor control system depends significantly on the choice of current control technique and the specific structure of the controller. The present disclosure describes feedforward current controllers that may be used in open-loop current control of DW-PMSMs that consider the electromagnetic coupling between the winding sets to achieve optimal current and torque control performance.

SUMMARY OF THE INVENTION

In one embodiment of the invention, a system for controlling a dual-wound synchronous machine is provided. The system comprises a processor and a memory including instructions. When executed by the processor, the instructions cause the processor to: determine a positive virtual half-motor current command and a negative virtual half-motor current command based on a first motor current command associated with the first winding set and based on a second motor current command associated with the second winding set; calculate a positive virtual half-motor forward path voltage command based on the positive virtual half-motor current command and using a first set of gain factors; calculate a negative virtual half-motor forward path voltage command based on the negative virtual half-motor current command and using a second set of gain factors; determine a positive virtual half-motor final voltage command based on the positive virtual half-motor forward path voltage command; determine a negative virtual half-motor final voltage command based on the negative virtual half-motor forward path voltage command; determine a first final voltage command and a second final voltage command by applying a second mathematical transformation to the positive virtual half-motor final voltage command and the negative virtual half-motor final voltage command; command, based on the first final voltage command, a first inverter to apply a first output voltage to the first winding set and thereby causing a first output current to be generated in the first winding set; and command, based on the second final voltage command, a second inverter to apply a second output voltage to the second winding set and thereby causing a second output current to be generated in the second winding set. The first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

In another embodiment of the invention, a method of controlling a dual-wound synchronous machine is provided. The method comprises: determining a positive virtual half-motor current command and a negative virtual half-motor current command based on a first motor current command associated with the first winding set and based on a second motor current command associated with the second winding set; calculating a positive virtual half-motor forward path voltage command based on the positive virtual half-motor current command and using a first set of gain factors; calculating a negative virtual half-motor forward path voltage command based on the negative virtual half-motor current command and using a second set of gain factors; determining a positive virtual half-motor final voltage command based on the positive virtual half-motor forward path voltage command; determining a negative virtual half-motor final voltage command based on the negative virtual half-motor forward path voltage command; determining a first final voltage command and a second final voltage command by applying a second mathematical transformation to the positive virtual half-motor final voltage command and the negative virtual half-motor final voltage command; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. The first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

In another embodiment of the invention, a method of controlling a dual-wound synchronous machine is provided. The method comprises: calculating a first feedforward control signal based on a first motor current command associated with the first winding set and using a first set of gain factors; calculating a second feedforward control signal based on a second motor current command associated with the second winding set and using a second set of gain factors; calculating a first coupling compensation signal based on the second motor current command and using a third set of gain factors; calculating a second coupling compensation signal based on the first motor current command and using a fourth set of gain factors; determining a first final voltage command based on the first feedforward control signal and the first coupling compensation signal; determining a second final voltage command based on the second feedforward control signal and the second coupling compensation signal; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. The first output current and the second output current each have a d-axis component and a q-axis component, and at least one of the third set of gain factors and the fourth set of gain factors is configured to cause the d-axis component and the q-axis component of the first output current to be decoupled from variations of d-axis and q-axis components of the second output current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 10A-10B show block diagrams of dynamic feedforward current controllers for decoupled positive and negative virtual half-motor windings, according to the principles of the present disclosure.

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
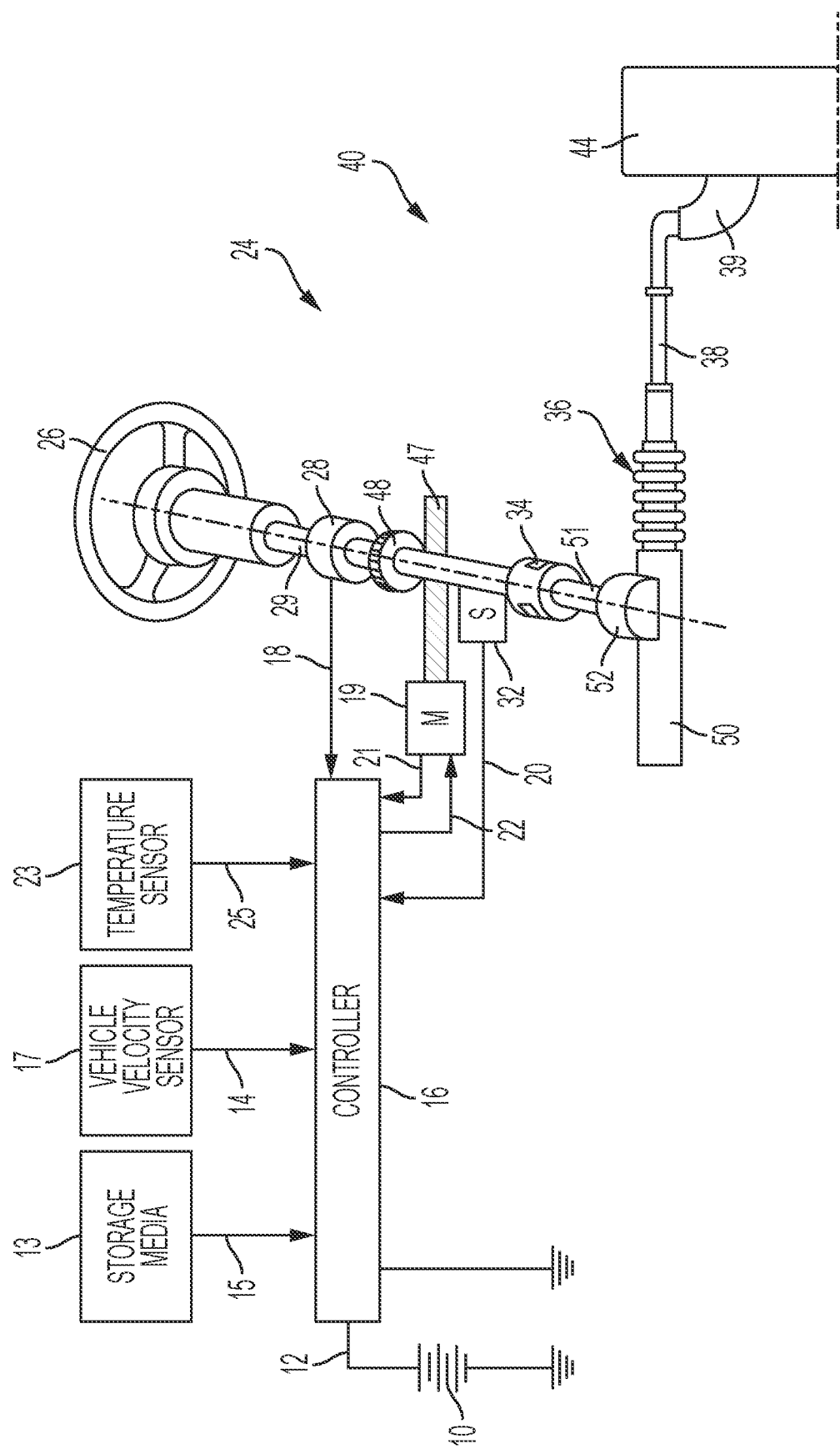
FIG. 1 is a schematic diagram of an EPS system according to the principles of the present disclosure.

FIG. 1 is a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a handwheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the steering motion control system generally designated by reference numeral 24 and includes the controller 16 and an electric machine, which could be a permanent magnet synchronous motor, and is hereinafter denoted as motor 19. The controller 16 is powered by the vehicle power supply 10 through supply conductors 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a velocity signal 21. A motor velocity denoted $\omega_m$ may be measured, calculated or a combination thereof. For example, the motor velocity $\omega_m$ may be calculated as the change of the motor position as measured by a position sensor 32 over a prescribed time interval. For example, motor speed $\omega_m$ may be determined as the derivative of the motor position $\theta_m$ with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the steering motion control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28, which transmit the torque signals 18 indicative of an applied torque. Such a torque sensor 28 and the torque signals 18 therefrom, as may be responsive to a compliant torsion bar, spring, or similar apparatus (not shown) configured to provide a response indicative of the torque applied.

In one or more examples, a temperature sensor 23 is located at the motor 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and torque signals 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

As used herein, variables with a tilde (~) above the variable symbol represent an approximation, which may be determined by a mathematical calculation, a lookup table, etc. Variables with a bar above the variable symbol represent a vector quantity. Variables with a superscript star (*) represent commands or desired set point values.

Figure 2:
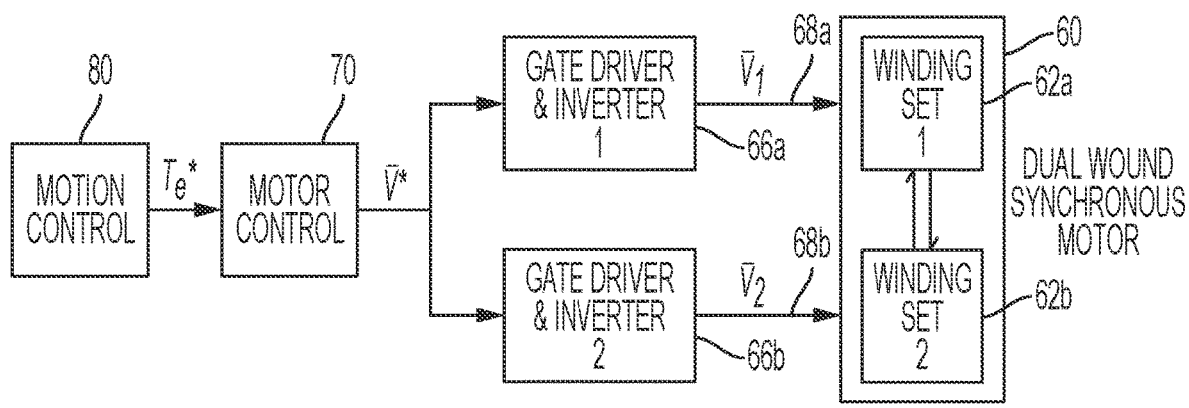
FIG. 2 is a schematic diagram of a dual wound motor drive system according to the principles of the present disclosure.

FIG. 2 illustrates an electric motor drive system having a dual wound permanent magnet synchronous motor (DW-PMSM), also called a dual wound synchronous machine (DWSM) or a dual wound motor 60, power converters 66a and 66b (each including a gate driver and a corresponding inverter), and a motor controller 70 (also referred to as a controller). The dual wound motor 60 may be used in any number of applications, such as for the motor 19 in the steering motion control system 24 shown in FIG. 1. The power converters 66a and 66b may include several switching devices, such as field effect transistors (FETs) for switching high current loads and gate driver circuitry for operating the switching devices. The motor controller 70 receives a motor torque command $T_e^*$ from a motion controller 80, such as, for example, a power steering controller.

The motor controller 70 may generate the voltage command $\nabla^*$ based on the motor torque command $T_e^*$ from the motion controller 80, and using any feedforward control technique. For example, the motor controller 70 may include a voltage command generator (not shown) to generate the voltage command ∇* using one or more optimizations and/or to cause the electric motor drive system to satisfy one or more operating constraints, such as constraints on voltage and/or current produced by or supplied to the electric motor drive system. The feedforward voltage control technique may include a technique provided in the present disclosure, although other feedforward control techniques may be used.

The dual wound motor 60 includes a first winding set 62a and a second winding set 62b that is electrically independent of the first winding set 62a. The dual wound motor 60 is capable of generating electromagnetic torque by energizing either or both winding sets 62a, 62b. The two winding sets 62a and 62b may each include three phases and thus, each of the two winding sets 62a, 62b may include three phase windings. Alternatively, each of the winding sets 62a, 62b may include any number of winding phases, such as five or seven phases. In some embodiments, the dual wound motor 60 is a poly-phase permanent magnet synchronous machine (PMSM). However, the dual wound motor 60 may be any type of synchronous machine, such as a poly-phase wound-field synchronous machine. Additionally, the dual wound motor 60 may have a salient pole configuration or a non-salient pole configuration, depending on the placement of the permanent magnets or field winding on the rotor. Each of the winding sets 62a, 62b may function individually, and the dual wound motor 60 can be operated by energizing either or both of the winding sets 62a, 62b.

The power converters 66a and 66b are configured to supply alternating current (AC) voltages to the winding sets 62a and 62b, respectively. The winding sets 62a, 62b are connected to their respective power converters 66a, 66b through the phase leads 68a and 68b. This configuration may provide for redundancy, allowing the dual wound motor 60 to continue to function even with a total loss or failure of one of the winding sets 62a, 62b, one of the motor leads 68a, 68b, and/or one of the power converters 66a, 66b. The power converters 66a, 66b may be implemented with electrical isolation for additional redundancy.

The motor controller 70 generates a voltage command ∇* based on the motor torque command $T_e^*$. The voltage command ∇* may include d-axis and q-axis constituent parts, $V_d^*$, $V_q^*$, respectively. Each of the power converters 66a, 66b applies an output voltage $\nabla_1$, $\nabla_2$ to the corresponding one of the winding sets 62a, 62b based on the voltage command ∇*.

The main limitation of the topology in FIG. 2 is that there is only one voltage command ∇* output of the motor controller 70, and thus identical voltage commands must be utilized by power converters 66a, 66b to produce almost identical voltage outputs $\nabla_1$, $\nabla_2$ for applying to the two winding sets 62a, 62b. This leaves no control flexibility to obtain "optimal" control performance taking into account the inductive coupling between the two winding sets 62a, 62b, since the output to each of the power converters 66a, 66b is "tied" (i.e. identical), any independent measurements regarding the two winding sets 62a, 62b cannot be exploited for enhancing the control performance.

Figure 3A:
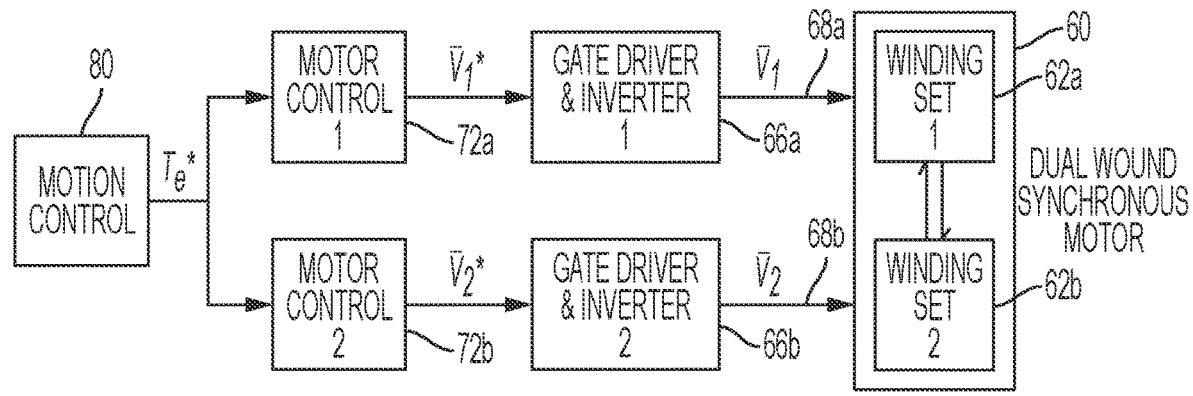
FIGS. 3A-3B are schematic diagrams of dual wound motor drive systems according to the principles of the present disclosure.

FIG. 3A shows a schematic diagram of a dual wound motor control system that is similar or identical to the motion control system of FIG. 2, except with independent first and second motor controllers 72a, 72b in place of the single motor controller 70 of FIG. 2. The first motor controller 72a may generate a first voltage command $\nabla_1^*$ to be applied to the first winding set 62a via the first power converter 66a and based on the motor torque command $T_e^*$. The second motor controller 72b may, similarly, generate a second voltage command $\nabla_2^*$ to be applied to the second winding set 62b via the second power converter 66b and based on the motor torque command $T_e^*$. Thus, the dual wound motor control system of FIG. 3A may provide independent voltage control of the two winding sets 62a, 62b.

Figure 3B:
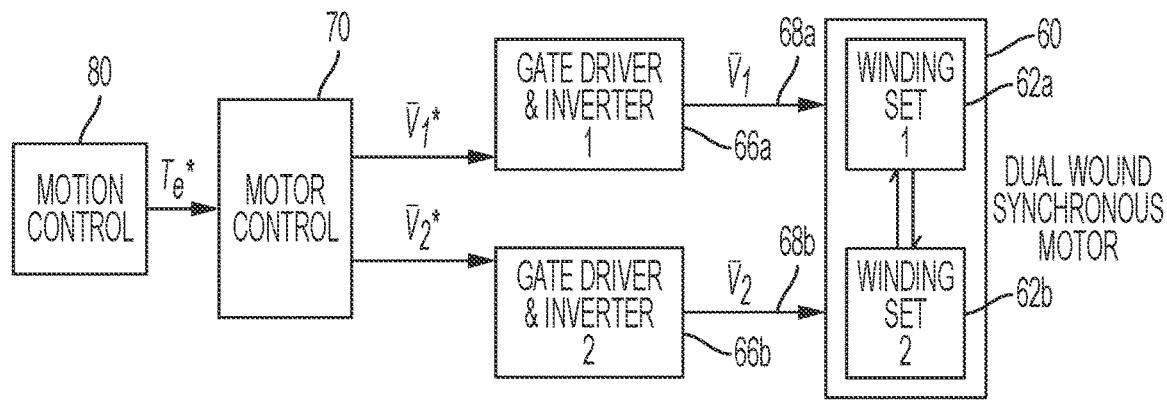

FIG. 3B shows a schematic diagram of a dual wound motor control system that is similar or identical to the motion control system of FIG. 2, except with the motor controller 70 configured to generate and supply independent first and second voltage commands $\nabla_1^*$, $\nabla_2^*$ to the corresponding power converters 66a, 66a, respectively. Thus, the dual wound motor control system of FIG. 3B may also provide independent voltage control of the two winding sets 62a, 62b.

Control algorithm development for DW-PMSMs previously has assumed negligible inductive coupling exists between the two half-motors. While the idea that such coupling may exist has been conceived, sufficient analytical or mathematical models capturing the effect have not been derived or presented. As a result, conventional control designs do not consider this coupling, and there is always inherently some current induction between the two sides of the DW motor. This document presents a general mathematical model of DW-PMSMs in the synchronous or dq reference frame which is valid for non-salient as well as salient pole configurations. A simplified model that is applicable to non-salient pole machines is also provided.

The general mathematical model of DW-PMSMs is shown in equation (1), below.

$$\begin{bmatrix} V_{d1} \\ V_{q1} \\ V_{d2} \\ V_{q2} \end{bmatrix} = \begin{bmatrix} R+L_d s & \omega_e L_q & M_d s & \omega_e M_q \\ -\omega_e L_d & R+L_q s & -\omega_e M_d & M_q s \\ M_d s & \omega_e M_q & R+L_d s & \omega_e L_q \\ -\omega_e M_d & M_q s & -\omega_e L_d & R+L_q s \end{bmatrix} \begin{bmatrix} I_{d1} \\ I_{q1} \\ I_{d2} \\ I_{q2} \end{bmatrix} + \omega_e \begin{bmatrix} 0 \\ \lambda_m \\ 0 \\ \lambda_m \end{bmatrix} \quad (1)$$

In this model, the two sides, or half-motors are referred to using subscripts 1 and 2, $V_d$ and $V_q$ are the d-axis and q-axis motor voltages, respectively. $I_d$ and $I_q$ are the d-axis and q-axis motor currents, respectively. R is the phase resistance, $L_d$ and $L_q$ are the d-axis and q-axis inductances, respectively of each half-motor. $M_d$ and $M_q$ are the inductance terms that represent coupling between the two half-motors, $\omega_e$ is the electrical motor velocity, and $\lambda_m$ is the permanent magnet (PM) flux linkage. Note that the electrical motor velocity is also referred to as the synchronous frequency of the machine and is related to the mechanical motor velocity $\omega_m$ as follows:

$$\omega_e = p\omega_m \quad (2)$$

where p is the number of magnetic pole pairs.

The electromagnetic torque $T_e$ is determined by equation (3), below:

$$T_e = p((\lambda_m(I_{q1}+I_{q2}))+(L_q-L_d)(I_{d1}I_{q1}+I_{d2}I_{q2})+(M_q-M_d)(I_{d1}I_{q2}+I_{d2}I_{q1})) \quad (3)$$

The parameters in equations (1)-(3) may vary significantly during normal operation of the dual wound motor 60. The resistance R varies with temperature of the windings of the dual wound motor 60 and may be different for the two winding sets. The inductances $L_d$, $L_q$, $M_d$, $M_q$ may each simultaneously vary independently and nonlinearly due to magnetic saturation (represented through dependency on currents $I_{d1}$, $I_{q1}$, $I_{d2}$, $I_{q2}$). The PM flux linkage $\lambda_m$ may vary due to magnetic saturation and temperature.

A simplified mathematical model for non-salient pole machines assuming equal d-axis and q-axis inductances is shown in equation (4), below.

$$\begin{bmatrix} V_{d1} \\ V_{q1} \\ V_{d2} \\ V_{q2} \end{bmatrix} = \begin{bmatrix} R+Ls & \omega_e L & Ms & \omega_e M \\ -\omega_e L & R+Ls & -\omega_e M & Ms \\ Ms & \omega_e M & R+Ls & \omega_e L \\ -\omega_e M & Ms & -\omega_e L & R+Ls \end{bmatrix} \begin{bmatrix} I_{d1} \\ I_{q1} \\ I_{d2} \\ I_{q2} \end{bmatrix} + \omega_e \begin{bmatrix} 0 \\ \lambda_m \\ 0 \\ \lambda_m \end{bmatrix} \quad (4)$$

The electromagnetic torque $T_e$ for a non-salient may be represented by equation (5), below:

$$T_e = p\lambda_m(I_{q1} + I_{q2}) \quad (5)$$

Figure 4:
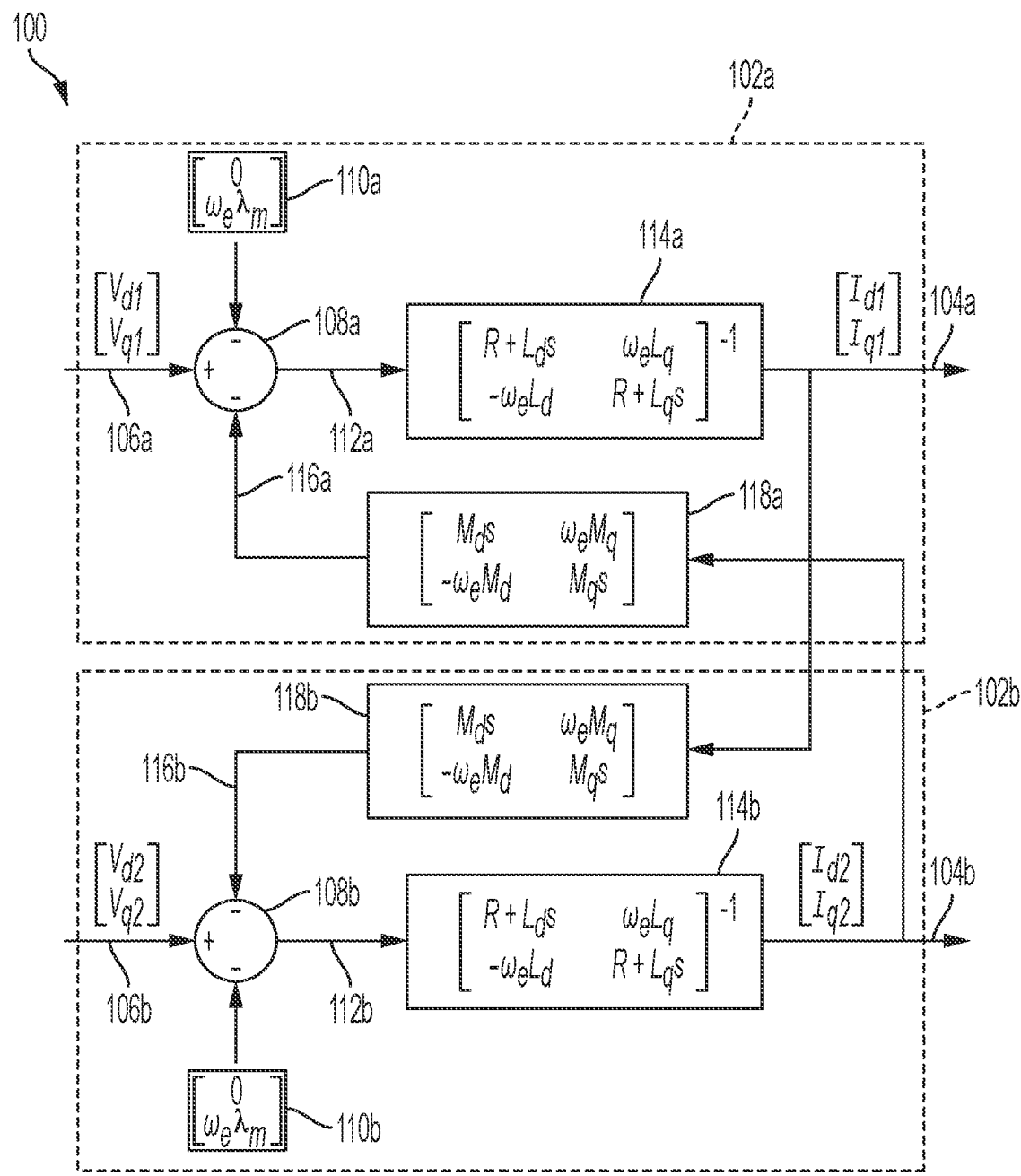
FIG. 4 is a block diagram representation of a mathematical model of a dual wound permanent magnet synchronous machine in the synchronous reference frame according to the principles of the present disclosure.

The two diagonal square matrices of equation (1) represent mathematical models of the individual windings sets, which is identical to that of a conventional single winding PMSM, while the off-diagonal matrices illustrate the coupling between the two sets of windings. A block diagram 100 representing this generalized mathematical model for a dual wound motor 60 is shown in FIG. 4.

Specifically, the block diagram 100 includes a first winding model 102a, and a second winding model 102b, with each of the winding models 102a, 102b representing operation of a corresponding one of the winding sets 62a, 62b of the dual wound motor 60. The first winding model 102a produces a first output signal 104a representing the first d-axis and q-axis currents $I_{d1}$, $I_{q1}$ generated by the first winding set 62a in response to a given first winding voltage signal 106a. Likewise, the second winding model 102b produces a second output signal 104b representing the second d-axis and q-axis currents $I_{d2}$, $I_{q2}$ generated by the second winding set 62b in response to a given second winding voltage signal 106b.

The first winding model 102a receives, as a first winding voltage signal 106a, a matrix with values for the first d-axis voltage $V_{d1}$ and the first q-axis voltage $V_{q1}$ applied to the first winding set 62a. This first winding voltage signal 106a is supplied to a first addition block 108a, which subtracts a first back-EMF (BEMF) signal 110a and produces a first composite signal 112a. The first composite signal 112a may represent a total sum of the voltages acting on the first winding set 62a. The first BEMF signal 110a represents BEMF generated by the first winding set 62a. The first composite signal 112a is supplied to a first transformation block 114a which generates the first output signal 104a based on the first composite signal 112a.

The second winding model 102b receives, as the second winding voltage signal 106b, a matrix with values for the second d-axis voltage $V_{d1}$ and the second q-axis voltage $V_{q1}$ applied to the second winding set 62b. This second winding voltage signal 106b is supplied to a second addition block 108b, which subtracts a second BEMF signal 110b and produces a second composite signal 112b. The second composite signal 112b may represent a total sum of the voltages acting on the second winding set 62b. The second BEMF signal 110b represents BEMF generated by the second winding set 62b. The second composite signal 112b is supplied to a second transformation block 114b which generates the second output signal 104b based on the second composite signal 112b.

The first winding model 102a also includes a first coupling transform block 118a that produces a first coupling voltage signal 116a based on the second output signal 104b. The first coupling voltage signal 116a represents effects on the first winding set 62a due to current in the second winding set 62b. The first coupling voltage signal 116a is supplied to the first addition block 108a, which reduces each component of the first composite signal 112a by a corresponding component value of the first coupling voltage signal 116a.

Likewise, the second winding model 102b also includes a second coupling transform block 118b that produces a second coupling voltage signal 116b based on the first output signal 104a. The second coupling voltage signal 116b represents effects on the second winding set 62b due to current in the first winding set 62a. The second coupling voltage signal 116b is supplied to the second addition block 108b, which reduces each component of the second composite signal 112b by a corresponding component value of the second coupling voltage signal 116b.

Figure 5:
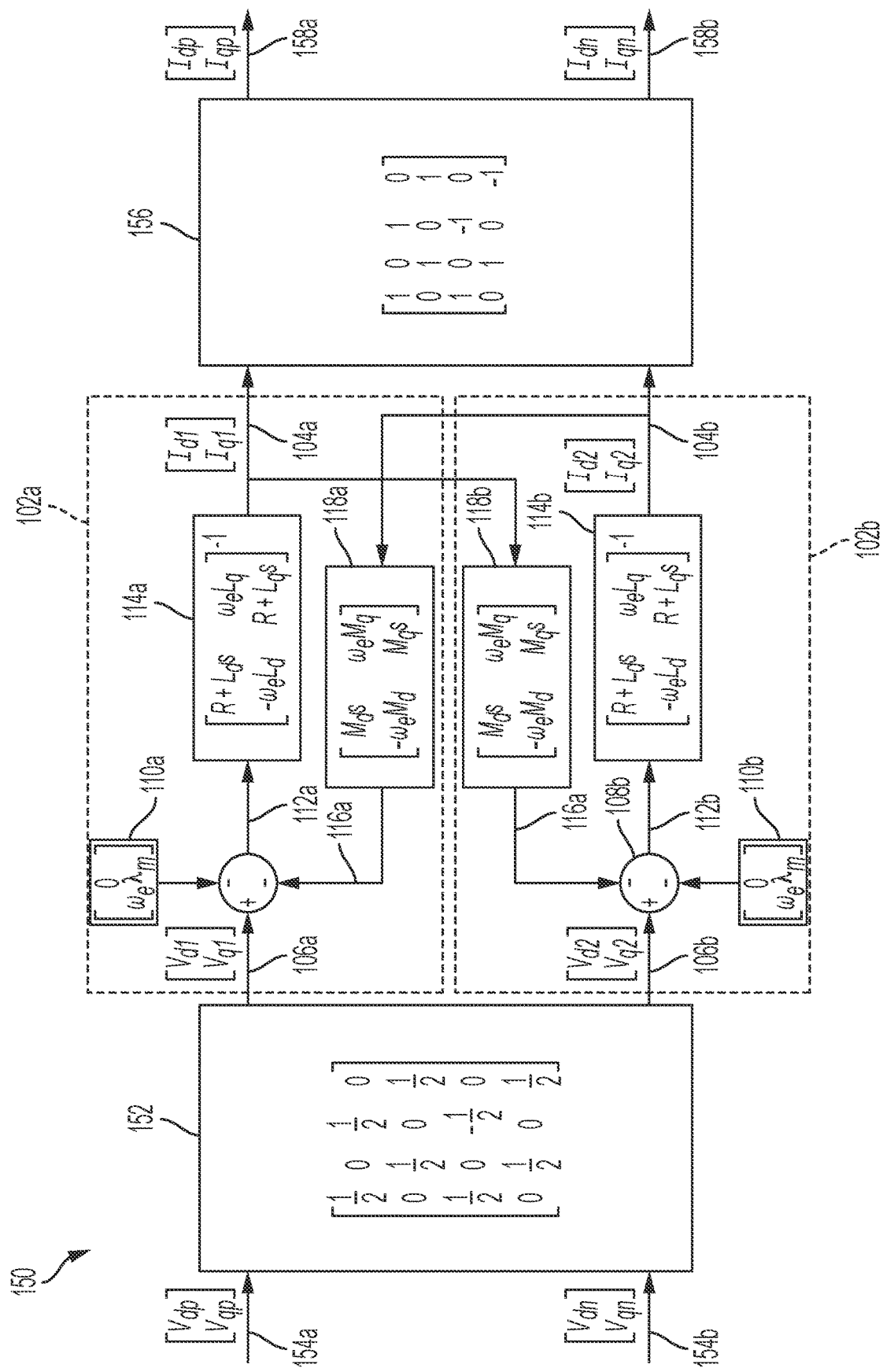
FIG. 5 is a block diagram representation of mathematical transformations for decoupling two half-motors of a dual wound permanent magnet synchronous motor according to the principles of the present disclosure.

Through mathematical manipulations shown in equations (6)-(8), below, the winding models 102a, 102b may be transformed, from a controls perspective, into two virtual-machines that are decoupled, as illustrated in FIG. 5.

$$X_{pn} = [R_f] X_{12} \quad (6)$$

$$X_{12} = [R_b] X_{pn} \quad (7)$$

$$R_b = R_f^{-1} \quad (8)$$

where $X_{pn}$ represents voltages or currents supplied to the positive and negative half-machines, $X_{12}$ represents a corresponding set of voltages or currents supplied to the winding sets 62a, 62b of the dual wound motor 60, $R_f$ represents a forward-direction transform and $R_b$ represents a backward-direction transform. Further, note that equation (8) shows that the backward-direction transform is the inverse of the forward-direction transform. In some embodiments, the forward-direction transform $R_f$ may take the form of the output transformation block 156. In some embodiments, the backward-direction transform $R_b$ may take the form of the input transformation block 152.

FIG. 5 shows a block diagram 150 of a dual wound PMSM model with these mathematical transformations applied on the voltage inputs and current outputs. Specifically, the block diagram 150 includes an input transformation block 152 that generates the first winding voltage signal 106a and the second winding voltage signal 106b based on a positive virtual half-motor voltage signal 154a and a negative virtual half-motor voltage signal 154b. The positive half-motor voltage signal 154a takes the form of 2×1 matrix with values for a d-axis voltage $V_{dp}$ and a q-axis voltage $V_{qp}$ supplied to the positive half-motor. Similarly, the negative half-motor voltage signal 154b takes the form of 2×1 matrix with values for a d-axis voltage $V_{dn}$ and a q-axis voltage $V_{qn}$ supplied to the negative half-motor.

The block diagram 150 also includes an output transformation block 156 that generates a positive virtual half-motor current signal 158a and a negative virtual half-motor current signal 158b based on the first output signal 104a from the first winding model 102a and based on the second output signal 104b from the second winding model 102b. The positive virtual half-motor current signal 158a takes the form of 2×1 matrix with values for a d-axis current $I_{dp}$ and a q-axis current $I_{qp}$. Similarly, the negative virtual half-motor current signal 158b takes the form of 2×1 matrix with values for a d-axis current $I_{dn}$ and a q-axis current $I_{qn}$.

With the transformations performed, the resultant machine model shown in equation (9) is obtained as follows:

$$\begin{bmatrix} V_{dp} \\ V_{qp} \\ V_{dn} \\ V_{qn} \end{bmatrix} = \quad (9)$$

-continued $$\begin{bmatrix} R+(L_d+M_d)s & \omega_e(L_q+M_q) & 0 & 0 \\ -\omega_e(L_d+M_d) & R+(L_q+M_q)s & 0 & 0 \\ 0 & 0 & R+(L_d-M_d)s & \omega_e(L_q-M_q) \\ 0 & 0 & -\omega_e(L_d-M_d) & R+(L_q-M_q)s \end{bmatrix}$$

$$\begin{bmatrix} I_{dp} \\ I_{qp} \\ I_{dn} \\ I_{qn} \end{bmatrix} + \omega_e \begin{bmatrix} 0 \\ 2\lambda_m \\ 0 \\ 0 \end{bmatrix}$$

The electromagnetic torque $T_e$ obtained as a result of the mathematical transformations may be expressed as shown in equation (10) as follows:

$$T_e = p(\lambda_m + ((L_q + M_q) - (L_d + M_d))I_{dp})I_{qp} \qquad (10)$$

Figure 6:
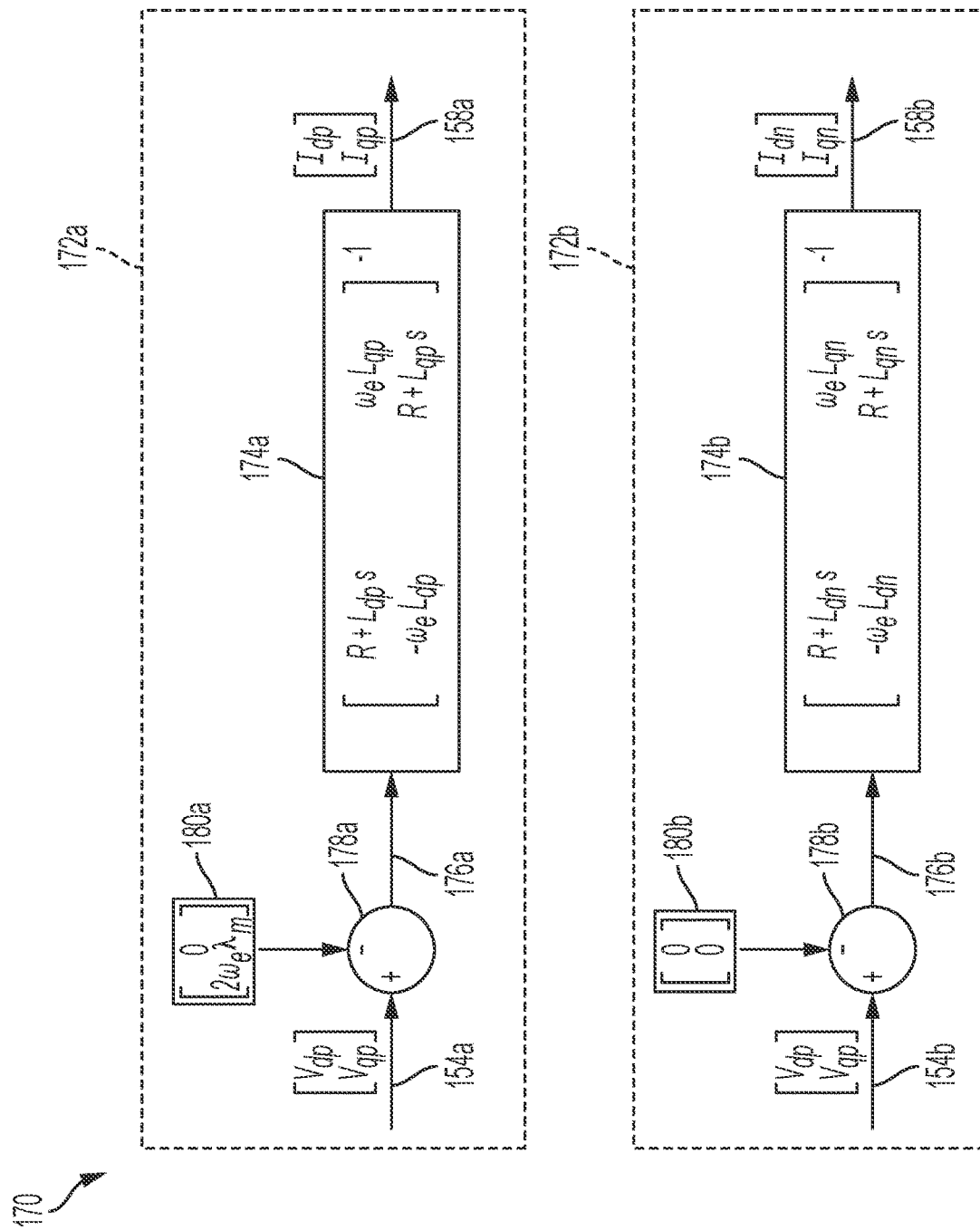
FIG. 6 is a block diagram showing a mathematical model showing two virtual half-motors of a dual wound permanent magnet synchronous motor resulting from the application of a decoupling transformation according to the principles of the present disclosure.

A block diagram representation of the decoupled model 170 is shown in FIG. 6. This decoupled model 170 may also be referred to as virtual model of dual wound PMSMs, as it illustrates two separate mathematical models that are independent of one another, and thus consists of a positive virtual half-motor and a negative virtual half-motor model that are decoupled from one another. Note that once the appropriate transformations related to the transformation matrices $R_p$, $R_b$ would need to be applied at the interfaces of the control algorithm blocks (not shown), the control algorithm design may be performed with the assumption that the "effective" motor (plant) from the standpoint of the controller is the decoupled model 170 of the dual wound motor 60 including positive and negative virtual half-motor windings 172a, 172b that are decoupled from one-another. Therefore, the decoupled model 170 includes a positive virtual half-motor winding 172a and a negative virtual half-motor winding 172b. The positive virtual half-motor winding 172a may also be called a positive virtual half-motor, and the negative virtual half-motor winding 172b may also be called a negative virtual half-motor.

The positive virtual half-motor winding 172a receives the positive virtual half-motor voltage signal 154a and produces the positive virtual half-motor current signal 158a. The positive virtual half-motor winding 172a includes a positive half-motor transfer matrix 174a that describes its dynamic behavior. The net voltage 176a resulting from the input voltage overcoming the BEMF voltage 180a, which is represented as a difference operation performed by the subtraction module 178a, serves as the input to the positive half-motor transfer matrix 174a which produces the positive virtual half-motor current signal 158a. Note that the positive half-motor BEMF voltage signal 180a includes a term $2\omega_e\lambda_m$, which incorporates both the BEMF signals 110a, 110b of the first and second winding models 102a, 102b, respectively.

The negative virtual half-motor winding 172b receives the negative virtual half-motor voltage signal 154b and produces the negative virtual half-motor current signal 158b. The negative virtual half-motor winding 172b includes a negative half-motor transfer matrix 174b that describes its dynamic behavior. The net voltage 176b resulting from the input voltage overcoming a voltage represented by a negative half-motor BEMF voltage signal 180b, which is represented as a difference result of a subtraction module 178b, serves as the input to the negative half-motor transfer matrix 174b which produces the negative virtual half-motor current signal 158b. Note that the negative half-motor BEMF voltage signal 180b includes a zero matrix, due to the positive half-motor BEMF voltage signal 180a incorporating both the BEMF signals 110a, 110b of the first and second winding models 102a, 102b, respectively. In other words, and unlike the positive virtual half-motor winding 172a, the negative virtual half-motor winding 172b does not include any BEMF compensation. The negative half-motor transfer matrix 174b is similar to the positive half-motor transfer matrix 174a, except for sign changes (positive to negative) in each of the elements.

With the transformations applied on the generalized model that results in the virtual half-motor windings 172a, 172b, the overall current regulation problem may be reduced to the regulation of the positive and negative virtual half-motor current signals 158a, 158b. The virtual half-motor windings 172a, 172b, each behave essentially the same as a typical single winding three-phase PMSM and thus, enhanced current regulation techniques may be employed for generating the corresponding virtual half-motor voltage signals 154a, 154b.

The mathematical model of the positive and negative virtual half-machines may be generalized and written in a compact form as equation (11), below:

$$\begin{bmatrix} V_{dx} \\ V_{qx} \end{bmatrix} = \begin{bmatrix} R+L_{dx}s & \omega_e L_{qx} \\ -\omega_e L_{dx} & R+L_{qx}s \end{bmatrix} \begin{bmatrix} I_{dx} \\ I_{qx} \end{bmatrix} + u \begin{bmatrix} 0 \\ \omega_e \lambda_m \end{bmatrix} \qquad (11)$$

where x may be replaced by either p or n and thus represents the positive or negative virtual half-machine, while u is a scalar quantity equal to 2 or 0 for the first and second virtual half-machine, respectively. The inductance terms for the two half machines may be expressed in terms of the self and coupling inductances of the dual wound motor 60 as shown in equations (12)-(15), as follows:

$$L_{dp} = L_d + M_d \qquad (12)$$

$$L_{qp} = L_q + M_q \qquad (13)$$

$$L_{dn} = L_d - M_d \qquad (14)$$

$$L_{qn} = L_q - M_q \qquad (15)$$

Figure 7:
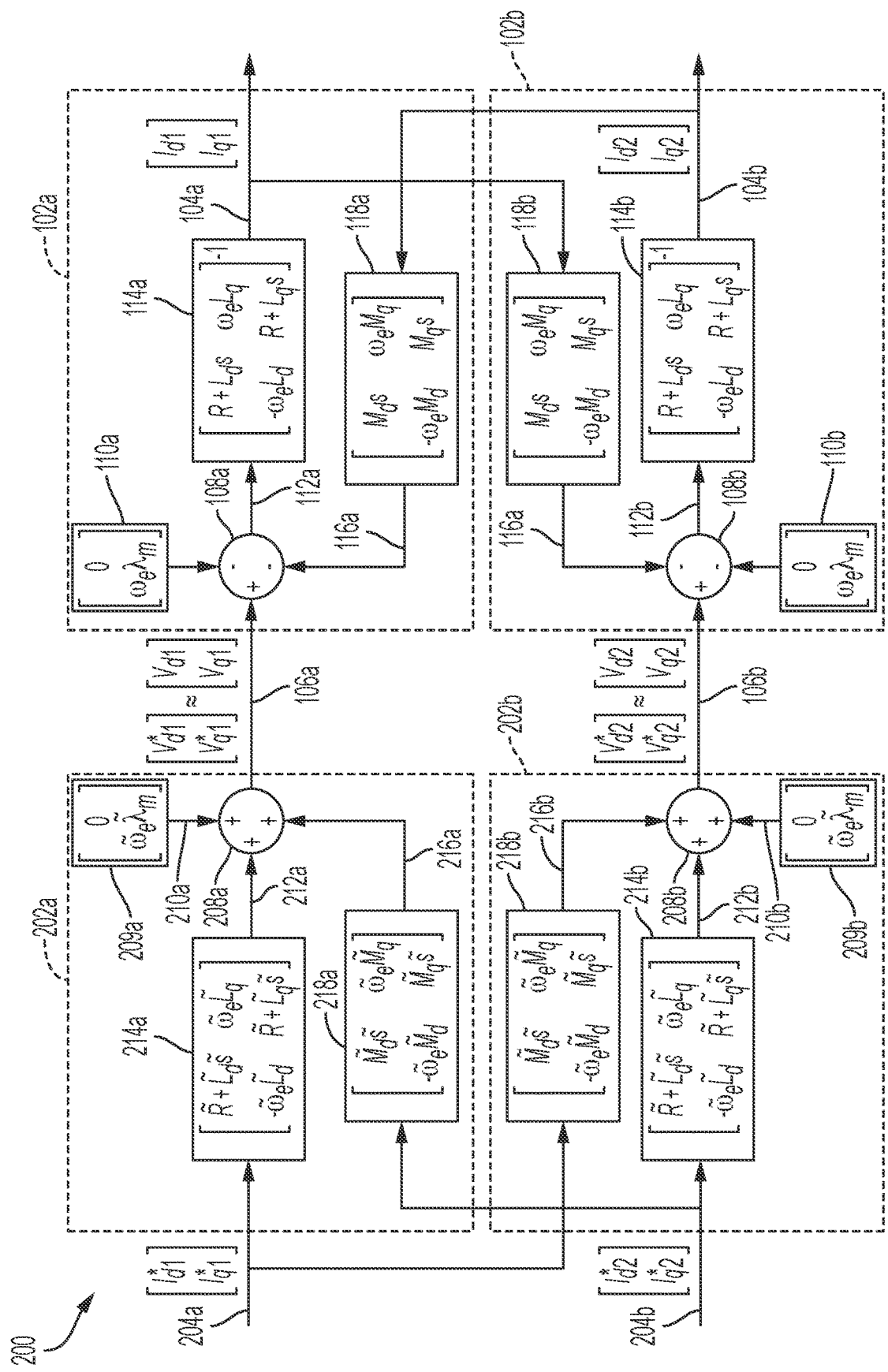
FIG. 7 is a block diagram showing a direct feedforward motor controller for a dual wound motor, according to the principles of the present disclosure.

FIG. 7 is a block diagram showing a direct feedforward motor controller 200 for a dual wound motor 60. The direct feedforward motor controller 200 includes a first feedforward current controller 202a configured to generate the first winding voltage signal 106a, which is applied to the first stator winding set 62a, as represented by the first winding model 102a. The direct feedforward motor controller 200 also includes a second feedforward current controller 202b configured to generate the second winding voltage signal 106b, which is applied to the second winding set 62b, as represented by the second winding model 102b.

The feedforward current controllers 202a, 202b are each configured to generate reference voltage signals $V_{d1}^*$, $V_{q1}^*$, $V_{d2}^*$, $V_{q2}^*$ that cause the corresponding winding set 62a, 62b of the dual wound motor 60 to produce or receive a motor current with d-axis and q-axis values $I_{d1}$, $I_{q1}$, $I_{d2}$, $I_{q2}$ equal to the corresponding d-axis and q-axis current command values $I_{d1}^*$, $I_{q1}^*$, $I_{d2}^*$, $I_{q2}^*$.

The first feedforward current controller 202a receives the first motor current command values $I_{d1}^*$, $I_{q1}^*$ on a first current input 204a, and uses those first motor current command values $I_{d1}^*$, $I_{q1}^*$ to generate the first winding voltage signal 106a, which may be written as d-axis and q-axis voltages $V_{d1}^*$, $V_{q1}^*$. That first reference voltage signal 106a may then be applied to the first stator winding set 62a as first applied voltages $V_{d1}$, $V_{q1}$, for example by the first switching set 66a.

Likewise, the second feedforward current controller 202b receives the second motor current command values $I_{d2}^*$, $I_{q2}^*$ on a second current input 204b, and uses those second motor current command values $I_{d2}^*$, $I_{q2}^*$ to generate the second winding voltage signal 106b, which may be written as d-axis and q-axis voltages $V_{d2}^*$, $V_{q2}^*$. That second reference voltage signal 106b may then be applied to the second winding set 62b as second applied voltages $V_{d2}$, $V_{q2}$, for example by the second switching set 66b.

The first feedforward current controller 202a includes a first addition block 208a, a first BEMF compensation block 209a configured to generate a first BEMF compensation voltage 210a, a first feedforward compensation block 214a configured to generate a first feedforward control signal 212a, and a first coupling compensation block 218a configured to generate a first coupling compensation signal 216a. The first addition block 208a produces the first winding voltage signal 106a by adding each of: the first BEMF compensation voltage 210a, the first feedforward control signal 212a, and the first coupling compensation signal 216a.

The first feedforward compensation block 214a, as shown in FIG. 7, performs a mathematical transform using a matrix of gain factors having the following form:

$$\begin{bmatrix} \tilde{R}+\tilde{L}_d\tilde{s} & \tilde{\omega}_e\tilde{L}_q \\ -\tilde{\omega}_e\tilde{L}_d & \tilde{R}+\tilde{L}_q\tilde{s} \end{bmatrix}$$

The first coupling compensation block 218a, as shown in FIG. 7, performs a mathematical transform using a matrix of gain factors having the following form:

$$\begin{bmatrix} \tilde{M}_d\tilde{s} & \tilde{\omega}_e\tilde{M}_q \\ -\tilde{\omega}_e\tilde{M}_d & \tilde{M}_q\tilde{s} \end{bmatrix}$$

The second feedforward current controller 202b also includes a second addition block 208b, a second BEMF compensation block 209b configured to generate a second BEMF compensation voltage 210b, a second feedforward compensation block 214b configured to generate a second feedforward control signal 212b, and a second coupling compensation block 218b configured to generate a second coupling compensation signal 216b. The second addition block 208b produces the second winding voltage signal 106b by adding each of: the second BEMF compensation voltage 210b, the second feedforward control signal 212b, and the second coupling compensation signal 216b.

The second feedforward compensation block 214b, as shown in FIG. 7, performs a mathematical transform using a matrix of gain factors having the following form:

$$\begin{bmatrix} \tilde{R}+\tilde{L}_d\tilde{s} & \tilde{\omega}_e\tilde{L}_q \\ -\tilde{\omega}_e\tilde{L}_d & \tilde{R}+\tilde{L}_q\tilde{s} \end{bmatrix}$$

The second coupling compensation block 218b, as shown in FIG. 7, performs a mathematical transform using a matrix of gain factors having the following form:

$$\begin{bmatrix} \tilde{M}_d\tilde{s} & \tilde{\omega}_e\tilde{M}_q \\ -\tilde{\omega}_e\tilde{M}_d & \tilde{M}_q\tilde{s} \end{bmatrix}$$

Each of the feedforward current controllers 200a, 200b of the direct feedforward motor controller 200 is configured as an inverse of the corresponding winding model 102a, 102b. For example, the BEMF compensation blocks 209a, 209b each include terms that are configured to offset the corresponding BEMF signals 110a, 110b. This offsetting may be performed, as shown in FIG. 7, by an addition performed by one of the addition blocks 208a, 208b that offsets the subtracting of the corresponding BEMF signal 110a, 110b, by the addition block 108a, 108b in the corresponding winding model 102a, 102b.

The feedforward compensation blocks 214a, 214b may each be configured to perform an inverse of the transformation block 114a, 114b in the corresponding winding model 102a, 102b. In some embodiments, the feedforward compensation blocks 214a, 214b may each be configured as an inverse matrix with terms corresponding to the terms of the transformation block 114a, 114b of the corresponding winding model 102a, 102b. Similarly, the coupling compensation blocks 218a, 218a may each be configured as in inverse matrix with terms corresponding to the terms of the coupling transform block 118a, 118b of the corresponding winding model 102a, 102b.

In this implementation, the $\tilde{s}$ operation may be implemented through one of several discrete-time derivative filter designs. For example, a continuous-time derivative with a low pass filter may be discretized using the backward difference method.

Figure 8:
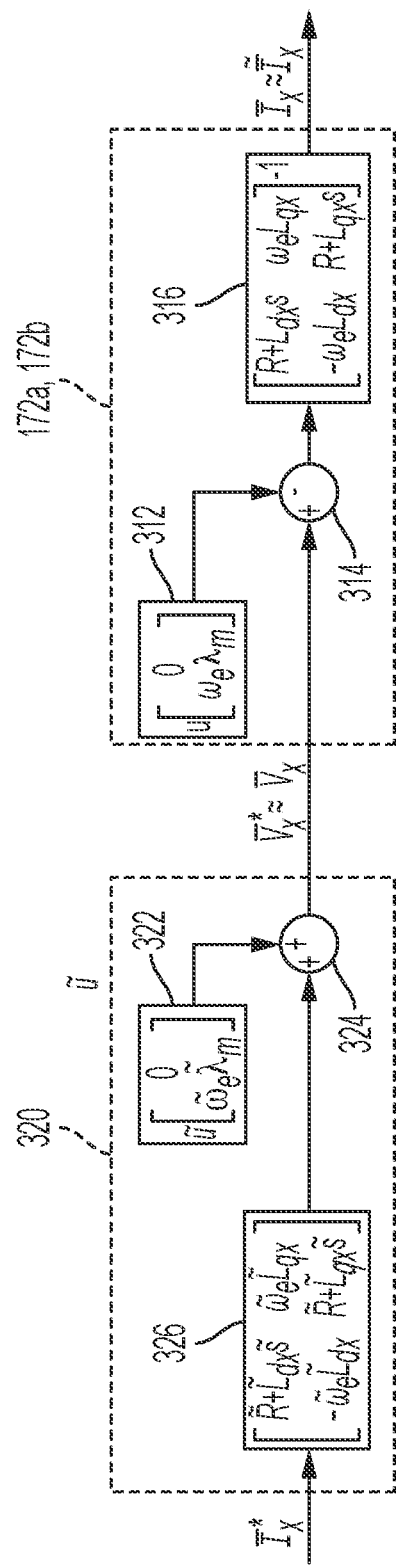
FIG. 8 is a block diagram showing a dynamic feedforward current controller for a virtual half-motor winding, according to the principles of the present disclosure.

FIG. 8 is a block diagram showing a dynamic feedforward current controller 320 for generating a voltage command $\nabla_x^*\nabla^*$ for application to a corresponding one of the virtual half-motor windings 172a, 172b. The dynamic feedforward current controller 320 may take into account dynamic parameters of the corresponding one of the virtual half-motor windings 172a, 172b (i.e. $\tilde{L}_{dx}$).

As shown in FIG. 8, the virtual half-motor windings 172a, 172b includes a BEMF term 312 having the form $$u\begin{bmatrix} 0 \\ \omega_e\lambda_m \end{bmatrix},$$

where u is 0 or 2, and which is a generalized form of the BEMF voltage signals 180a, 180b. The virtual half-motor windings 172a, 172b also includes a subtraction module 314 configured to subtract the BEMF term 312 from the voltage command $\nabla_x^*$. The subtraction module 314 of FIG. 8 may generally represent the subtraction modules 178a, 178b of the virtual half-motor windings 172a, 172b. The virtual half-motor windings 172a, 172b also includes a virtual motor transfer matrix 316 that generally describes the positive half-motor transfer matrix 174a and the negative half-motor transfer matrix 174b, and which describes the dynamic behavior of the virtual half-motor windings. The virtual motor transfer matrix 316 performs a mathematical transform using a matrix of gain factors having the following form:

$$\begin{bmatrix} \tilde{R}+\tilde{L}_{dx}\tilde{s} & \tilde{\omega}_e\tilde{L}_{qx} \\ -\tilde{\omega}_e\tilde{L}_{dx} & \tilde{R}+\tilde{L}_{qx}\tilde{s} \end{bmatrix}^{-1}$$

the subscript x represents either p or n for the positive or negative half-motor, respectively, and derivative term is shown as $\tilde{s}$ and may be calculated or otherwise determined using a derivative estimation module. The derivative estimation module may determine an approximation of a true derivative. In general, many different types of derivative filter designs may be used, from simple high pass filters to more sophisticated discrete time derivative filters with specific magnitude and phase characteristics, depending on the application.

The dynamic feedforward current controller 320 includes a BEMF compensation module 322 configured to produce a BEMF compensation voltage. The dynamic feedforward current controller 320 also includes a first feedforward compensation module 326 configured to produce a feedforward voltage command based on the reference current signal $\bar{I}_x^*$. The first feedforward compensation module 326 may be configured as an inverse matrix with terms corresponding to the terms of the virtual motor transfer matrix 316 of the corresponding winding model 172a, 172b. The dynamic feedforward current controller 320 also includes an addition module 324 configured to add the BEMF compensation voltage from the BEMF compensation module 322 to the feedforward voltage command from the first feedforward compensation module 326 and to generate the voltage command $\nabla_x^*$ as a sum thereof.

For the dynamic feedforward current controller shown in FIG. 8, the direct transfer functions become:

$$T_{ddx}(s) = \frac{L_{qx}\tilde{L}_{dx}s\tilde{s}_x + L_{qx}\tilde{R}s + \tilde{L}_{dx}R\tilde{s}_x + \omega_e\tilde{\omega}_e\tilde{L}_{dx}L_{qx}}{L_{dx}L_{qx}s^2 + R(L_{dx} + L_{qx})s + R^2 + \omega_e^2 L_{dx}L_{qx}} \quad (16)$$

$$T_{qqx}(s) = \frac{L_{dx}\tilde{L}_{qx}s\tilde{s}_x + L_{dx}\tilde{R}s + L_{qx}R\tilde{s}_x + \omega_e\tilde{\omega}_e\tilde{L}_{qx}L_{dx}}{L_{dx}L_{qx}s^2 + R(L_{dx} + L_{qx})s + R^2 + \omega_e^2 L_{dx}L_{qx}} \quad (17)$$

It can be appreciated from equations (16) and (17) that if the derivative filter were ideal, both the transfer functions may simply become unity. The derivative filter is contained within the first feedforward compensation module 326 in FIG. 8.

Figure 9:
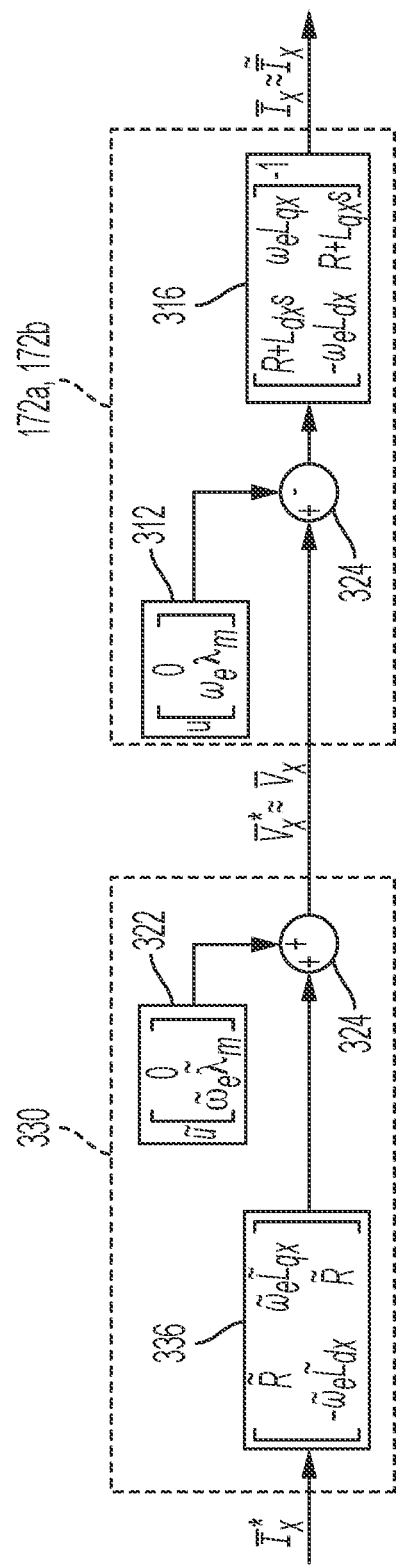
FIG. 9 is a block diagram showing a static feedforward current controller for a virtual half-motor winding, according to the principles of the present disclosure.

FIG. 9 is a block diagram showing a static feedforward current controller 330 for generating a voltage command $\nabla_x^*\nabla^*$ for application to a corresponding one of the virtual half-motor windings 172a, 172b. The static feedforward current controller may not take into account dynamic parameters of the corresponding one of the virtual half-motor windings 172a, 172b (i.e. $\tilde{L}_{dx}$).

The static feedforward current controller 330 may be similar or identical to the dynamic feedforward current controller 320, except with a second feedforward compensation module 336 in place of the first feedforward compensation module 326 and having simplified terms. The second feedforward compensation module 336 of the static feedforward current controller 330 performs a mathematical transform using a matrix of gain factors having the following form:

$$\begin{bmatrix} \tilde{R} & \tilde{\omega}_e\tilde{L}_{qx} \\ -\tilde{\omega}_e\tilde{L}_{dx} & \tilde{R} \end{bmatrix}$$

For the static feedforward current controller shown in FIG. 9, the direct transfer functions become:

$$T_{ddx}(s) = \frac{L_{qx}\tilde{R}s + R\tilde{R} + \omega_e\tilde{\omega}_e\tilde{L}_{dx}L_{qx}}{L_{dx}L_{qx}s^2 + R(L_{dx} + L_{qx})s + R^2 + \omega_e^2 L_{dx}L_{qx}} \quad (18)$$

$$T_{qqx}(s) = \frac{L_{dx}\tilde{R}s + R\tilde{R} + \omega_e\tilde{\omega}_e\tilde{L}_{qx}L_{dx}}{L_{dx}L_{qx}s^2 + R(L_{dx} + L_{qx})s + R^2 + \omega_e^2 L_{dx}L_{qx}} \quad (19)$$

FIGS. 10A-10B show block diagrams of a motor control system having two of the dynamic feedforward current controllers 320 for decoupled positive and negative virtual half-motor windings 172a, 172b, respectively. Alternatively, a feedforward current system may employ one or more of the static feedforward current controllers 330 or some other current controller design in place of one or both of the dynamic feedforward current controllers 320.

Figure 11A:
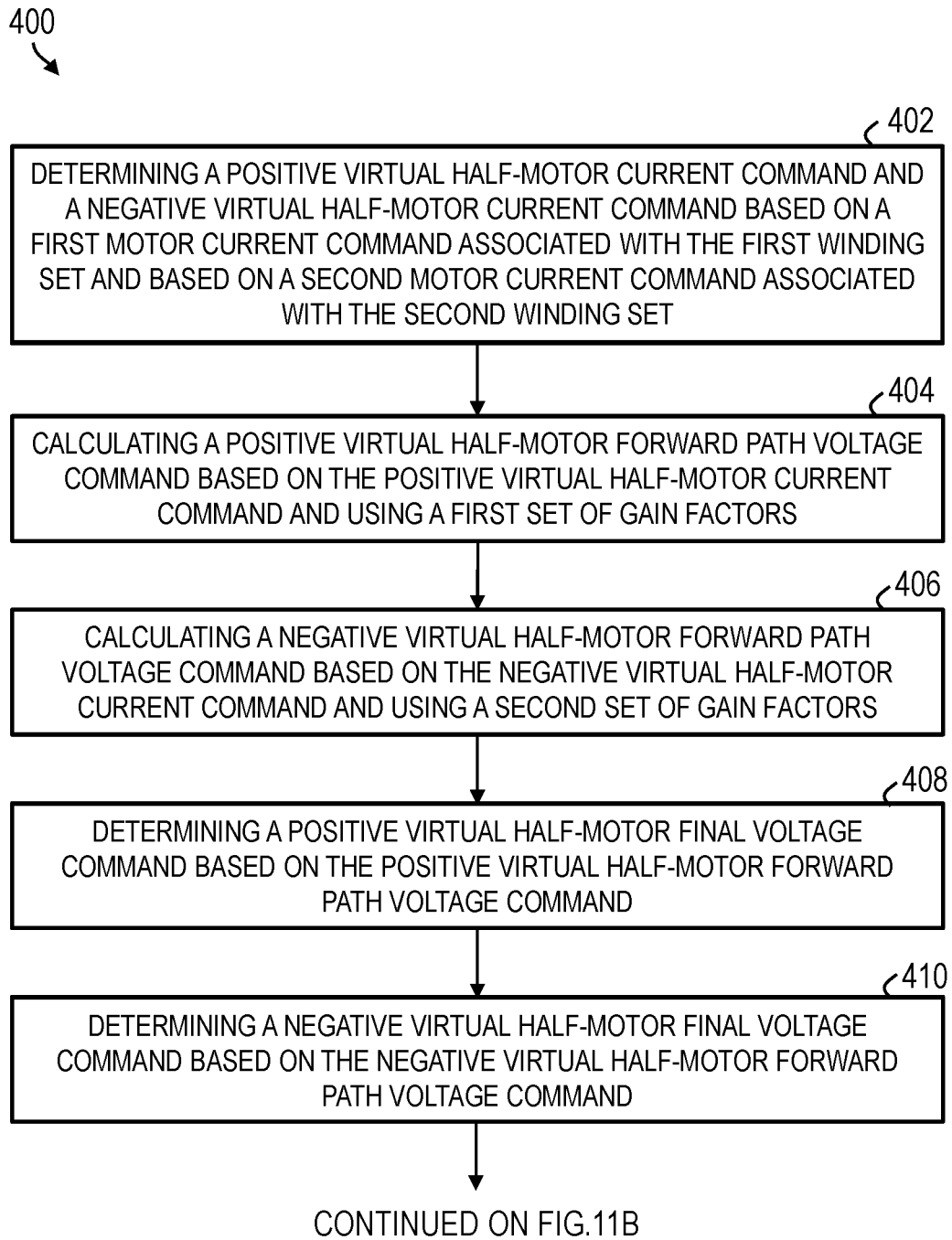
FIGS. 11A-11B show a flow diagram illustrating a first method for controlling a dual wound electric motor, according to the principles of the present disclosure.
Figure 11B:
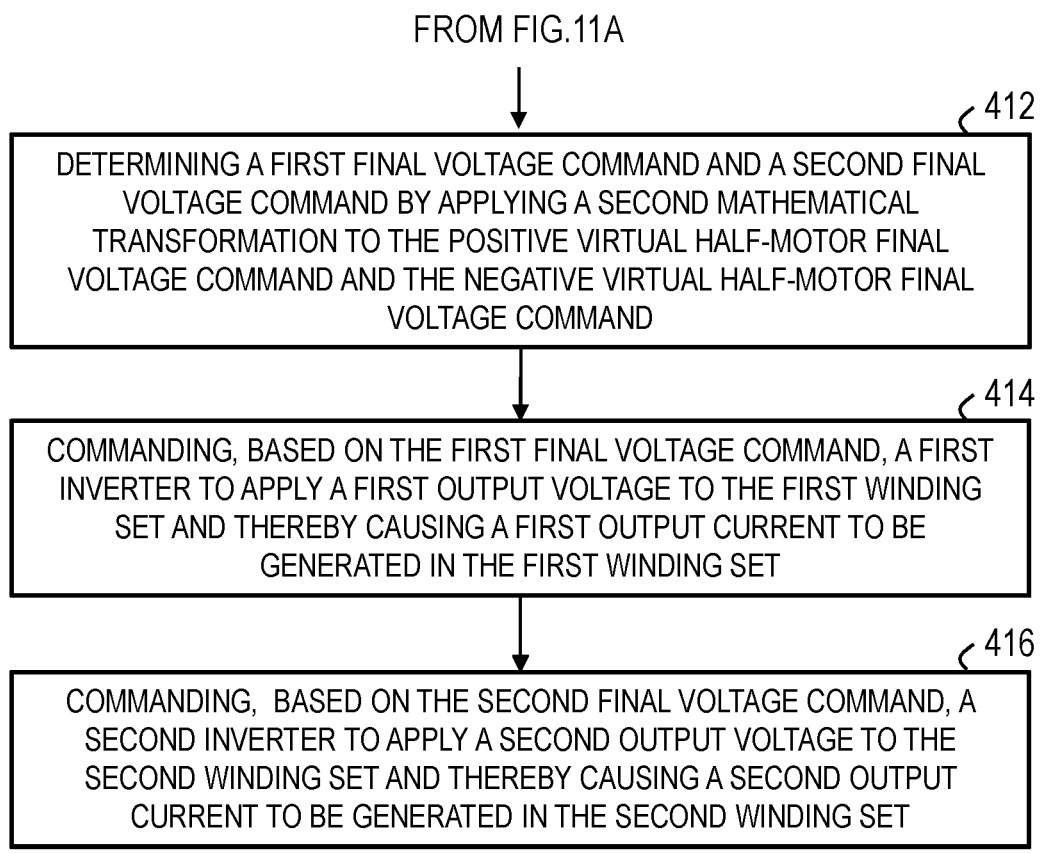

FIGS. 11A-11B show a flow diagram illustrating a first method 400 for controlling a dual wound synchronous machine (DWSM), also called a dual wound motor 60, having a first winding set 62a and a second winding set 62b according to the principles of the present disclosure. The first method 400 can be performed by the motor controller 70, in accordance with some embodiments of the present disclosure. As can be appreciated in light of the disclosure, the order of operation within the method is not limited to the sequential execution as illustrated in FIGS. 11A-11B, but may be performed in one or more varying orders as applicable and in accordance with the present disclosure.

At 402, the first method 400 determines a positive virtual half-motor current command $\bar{I}_p^*$ and a negative virtual half-motor current command $\bar{I}_n^*$ based on a first motor current command $\bar{I}_1^*$ associated with the first winding set 62a and based on a second motor current command $\bar{I}_2^*$ associated with the second winding set 62b. For example, the motor controller 70 may implement a mathematical transformation to calculate the positive virtual half-motor current command $\bar{I}_p^*$ and the negative virtual half-motor current command $\bar{I}_n^*$ based on each of a first motor current command $\bar{I}_1^*$ associated with the first winding set 62a and based on a second motor current command $\bar{I}_2^*$ associated with the second winding set 62b. This mathematical transformation used to calculate the positive virtual half-motor current command $\bar{I}_p^*$ and the negative virtual half-motor current command $\bar{I}_n^*$ based on the first and second motor current commands $\bar{I}_1^*, \bar{I}_2^*$ may be similar or identical to the output transformation block 156 of block diagram 150 shown on FIG. 5.

At 404, the first method 400 calculates a positive virtual half-motor forward path voltage command based on the positive virtual half-motor current command $\bar{I}_p^*$ and using a first set of gain factors. For example, the motor controller 70 may implement the first feedforward compensation module 326 of the dynamic feedforward current controller 320, as shown in FIG. 10A. Alternatively, the motor controller 70 may implement one of the second feedforward compensation module 336 of the static feedforward current controller 330 to perform this step.

At 406, the first method 400 calculates a negative virtual half-motor forward path voltage command based on the negative virtual half-motor current command $\bar{I}_n^*$ and using a second set of gain factors. For example, the motor controller 70 may implement the first feedforward compensation module 326 of the dynamic feedforward current controller 320, as shown in FIG. 10B. Alternatively, the motor controller 70 may implement one of the second feedforward compensation module 336 of the static feedforward current controller 330 to perform this step.

At 408, the first method 400 determines a positive virtual half-motor final voltage command $\nabla_p^*$ based on the positive virtual half-motor forward path voltage command. For example, the motor controller 70 may implement the addition module 324 of the of the dynamic feedforward current controller 320 to generate the positive virtual half-motor final voltage command $\nabla_p^*$ based on the feedforward voltage command from the first feedforward compensation module 326, as shown in FIG. 10A.

At 410, the first method 400 determines a negative virtual half-motor final voltage command $\nabla_n^*$ based on the negative virtual half-motor forward path voltage command. For example, the motor controller 70 may implement the addition module 324 of the of the dynamic feedforward current controller 320 to generate the negative virtual half-motor final voltage command $\nabla_n^*$ based on the feedforward voltage command from the first feedforward compensation module 326, as shown in FIG. 10B.

At 412, the first method 400 determines a first final voltage command $\nabla_1^*$ and a second final voltage command $\nabla_2^*$ by applying a second mathematical transformation to the positive virtual half-motor final voltage command $\nabla_p^*$ and the negative virtual half-motor final voltage command $\nabla_n^*$. For example, the motor controller 70 may apply the second mathematical transformation, which may be similar or identical to the input transformation block 152 of block diagram 150 shown on FIG. 5 in order to determine the first final voltage command $\nabla_1^*$ and the second final voltage command $\nabla_2^*$ based on the positive virtual half-motor final voltage command $\nabla_p^*$ and the negative virtual half-motor final voltage command $\nabla_n^*$.

At 414, the first method 400 commands, based on the first final voltage command $\nabla_1^*$, a first inverter to apply a first output voltage $\nabla_1$ to the first winding set 62a and thereby causing a first output current $\bar{I}_1$ to be generated in the first winding set 62a. For example, the motor controller 70 may generate and supply the first final voltage command $\bar{\nabla}_1^*$ to the first power converter 66a, thereby commanding the first inverter of the first power converter 66a to apply the first output voltage $\nabla_1$ to the first winding set 62a, thereby causing the first output current $\bar{I}_1$ to be generated in the first winding set 62a.

At 416, the first method 400 commands, based on the second final voltage command $\bar{\nabla}_2^*$, a second inverter to apply a second output voltage $\nabla_2$ to the second winding set 62b and thereby causing a second output current $\bar{I}_2$ to be generated in the second winding set 62b. For example, the motor controller 70 may generate and supply the second final voltage command $\bar{\nabla}_2^*$ to the second power converter 66b, thereby commanding the second inverter of the second power converter 66b to apply the second output voltage $\nabla_2$ to the second winding set 62b, thereby causing the second output current $\bar{I}_2$ to be generated in the second winding set 62b.

In some embodiments, the first output current $\bar{I}_1$ and the second output current $\bar{I}_2$ each have a d-axis component and a q-axis component, $I_{d1}$, $I_{q1}$, $I_{d2}$, $I_{q2}$, respectively, and at least one of the first set of gain factors and/or the second set of gain factors is configured to cause the d-axis component $I_{d1}$, and the q-axis component $I_{q1}$ of the first output current $\bar{I}_1$ to be decoupled from variations of the d-axis component $I_{d2}$ and the q-axis components $I_{q2}$ of the second output current $\bar{I}_2$. For example, one or more of the first or second sets of gain factors may cause the d-axis component $I_{d1}$, and the q-axis component $I_{q1}$ of the first output current $\bar{I}_1$ to be decoupled from variations of d-axis component $I_{d2}$ and the q-axis components $I_{q2}$ of the second output current $\bar{I}_2$.

In some embodiments, the at least one of the first set of gain factors and/or the second set of gain factors is further configured to cause the d-axis component $I_{d1}$ of the first output current $\bar{I}_1$ to be decoupled from variations of the q-axis component $I_{q1}$ of the first output current $\bar{I}_1$.

In some embodiments, both of the first set of gain factors and the second set of gain factors together cause the d-axis component $I_{d1}$ of the first output current $\bar{I}_1$ to be decoupled from variations of the q-axis component $I_{q1}$ of the first output current $\bar{I}_1$.

In some embodiments, calculating the positive virtual half-motor forward path voltage command based on the positive virtual half-motor current command $\bar{I}_p^*$ includes applying at least a portion of the first set of gain factors directly to the positive virtual half-motor current command. For example, the motor controller 70 may implement the first feedforward compensation module 326 of the dynamic feedforward current controller 320, for performing step 404, as shown in FIG. 10A.

In some embodiments, calculating the negative virtual half-motor forward path voltage command based on the negative virtual half-motor current command $\bar{I}_n^*$ includes applying at least a portion of the first set of gain factors directly to the negative virtual half-motor current command. For example, the motor controller 70 may implement the first feedforward compensation module 326 of the dynamic feedforward current controller 320, for performing step 406, as shown in FIG. 10B.

In some embodiments, the first method 400 calculates a BEMF compensation voltage configured to compensate for dynamics of BEMF in least one of a positive virtual half-motor and a negative virtual half-motor virtual half-motor. In some embodiments, at least one of the positive virtual half-motor final voltage command $\nabla_p^*$ and the negative virtual half-motor final voltage command $\nabla_n^*$ is further based on the BEMF compensation voltage. For example, and with reference to FIG. 10A, the motor controller 70 may implement the BEMF compensation module 322 to calculate a BEMF compensation voltage based on an estimated BEMF of the positive virtual half-motor winding 172a and which compensates for the dynamics of the estimated BEMF voltage. The motor controller 70 may also implement the addition module 324 to calculate the positive virtual half-motor final voltage command $\nabla_p^*$ as a sum of the BEMF compensation voltage from the BEMF compensation module 322 and the feedforward voltage command from the first feedforward compensation module 326.

In some embodiments, only one of the positive virtual half-motor final voltage command $\nabla_p^*$ and the negative virtual half-motor final voltage command $\nabla_n^*$ is further based on the BEMF compensation voltage. The BEMF compensation modules 322 each include a term u, which may be equal to 2 for one of the BEMF compensation modules 322 and equal to 0 (zero) for the other one of the BEMF compensation modules 322. For example, and with reference to FIGS. 10A-10B, the BEMF compensation module 322 of FIG. 10B, used in determining the negative virtual half-motor final voltage command $\nabla_n^*$ may include u=0, thus causing the negative virtual half-motor BEMF compensation voltage to have zero value. In other words, in some embodiments and as shown for example in FIGS. 10A-10B, only the positive virtual half-motor final voltage command $\nabla_p^*$ is based on a virtual half-motor BEMF compensation voltage, and the negative virtual half-motor final voltage command $\nabla_n^*$ does not include any BEMF compensation.

Figure 12A:
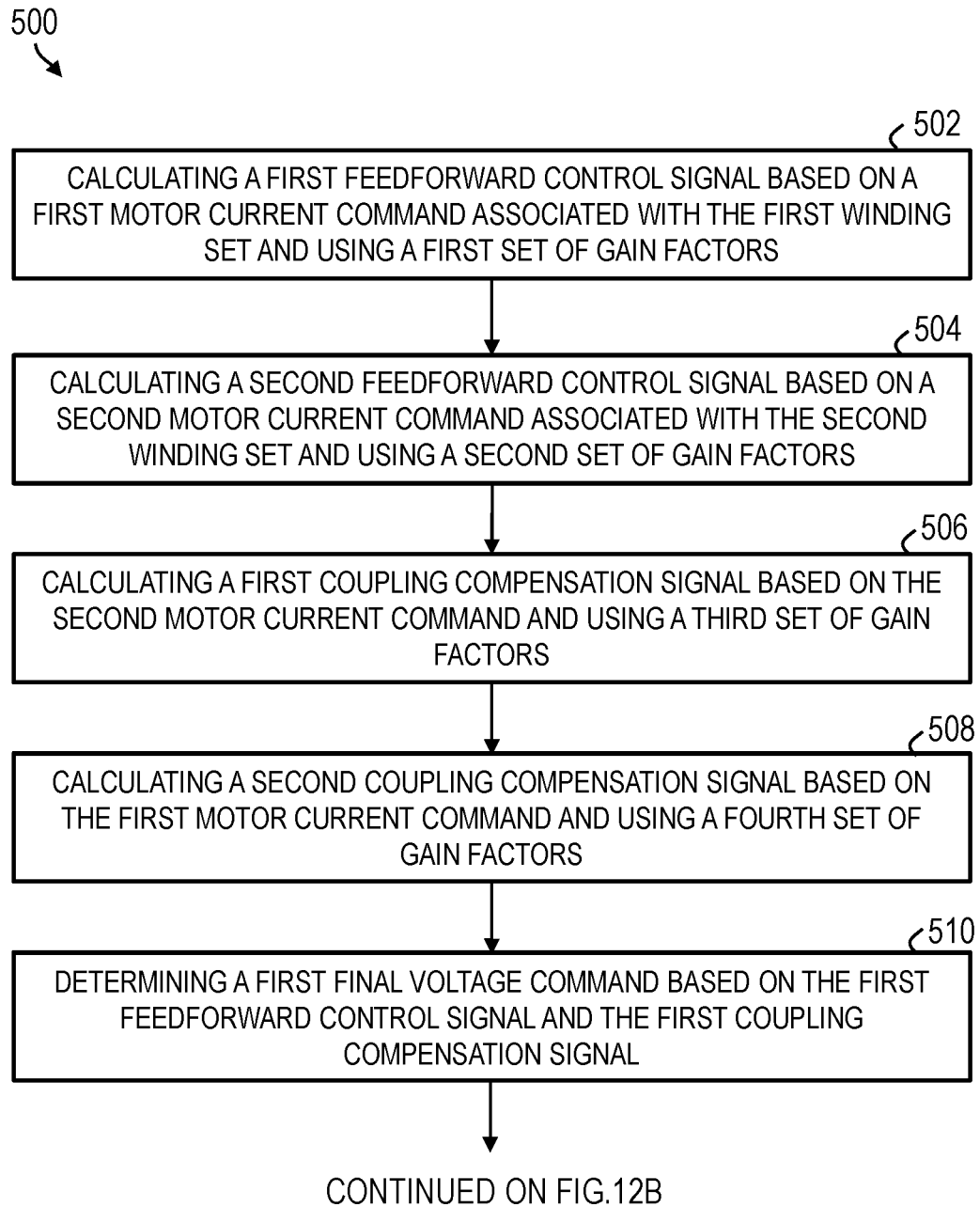
FIGS. 12A-12B show a flow diagram illustrating a second method for controlling a dual wound electric motor, according to the principles of the present disclosure.
Figure 12B:
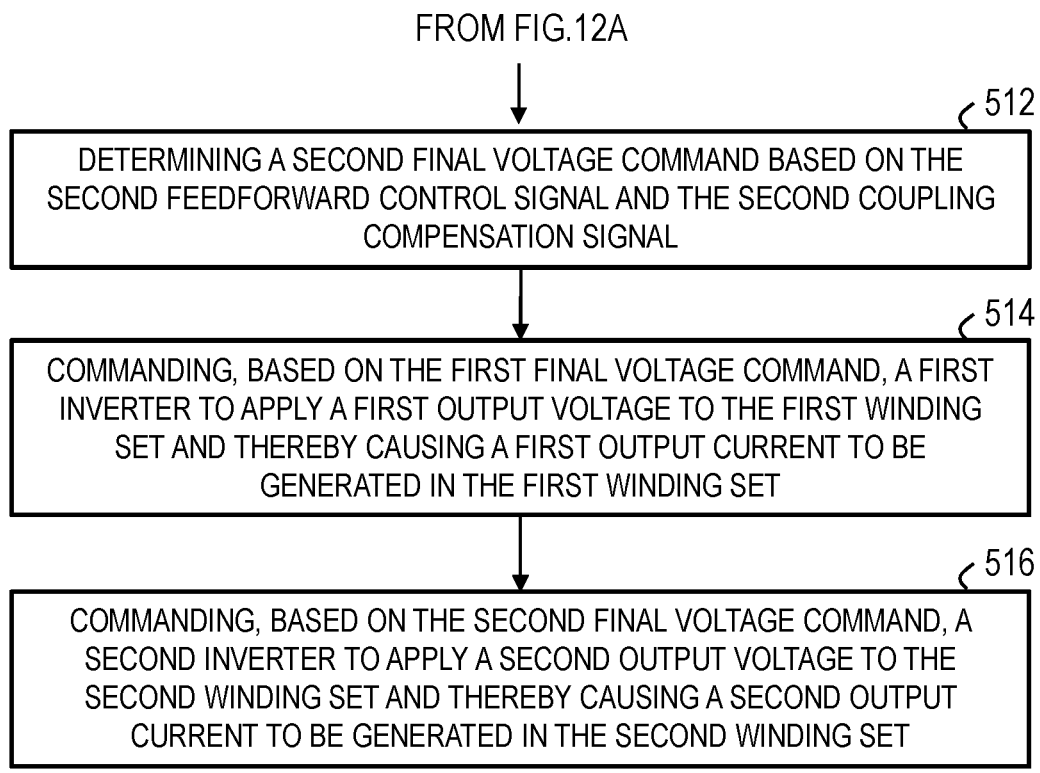

FIGS. 12A-12B show a flow diagram illustrating a second method 500 for controlling a dual wound synchronous machine (DWSM), also called a dual wound motor 60, having a first winding set 62a and a second winding set 62b according to the principles of the present disclosure. The second method 500 can be performed by the motor controller 70, in accordance with some embodiments of the present disclosure. As can be appreciated in light of the disclosure, the order of operation within the method is not limited to the sequential execution as illustrated in FIGS. 12A-12B, but may be performed in one or more varying orders as applicable and in accordance with the present disclosure. One or more steps of the second method 500 may be performed by the direct feedforward motor controller 200 shown in FIG. 7.

At 502, the second method 500 calculates a first feedforward control signal 212a based on a first motor current command associated with the first winding set and using a first set of gain factors. For example, the motor controller 70 may implement the first feedforward compensation block 214a of the first feedforward current controller 202a, as shown in FIG. 7, to generate the first feedforward control signal 212a based on the first motor current command values $I_{d1}^*$, $I_{q1}^*$.

At 504, the second method 500 calculates a second feedforward control signal 212b based on a second motor current command associated with the second winding set and using a second set of gain factors. For example, the motor controller 70 may implement the second feedforward compensation block 214b of the second feedforward current controller 202b, as shown in FIG. 7, to generate the second feedforward control signal 212b based on the second motor current command values $I_{d2}^*$, $I_{q2}^*$.

At 506, the second method 500 calculates a first coupling compensation signal 216a based on the second motor current command $I_{d2}^*$, $I_{q2}^*$ and using a third set of gain factors. For example, the motor controller 70 may implement the first coupling compensation block 218a to determine the first coupling compensation signal 216a by applying the fourth set of gain factors to the second motor current command $I_{d2}^*$, $I_{q2}^*$.

At 508, the second method 500 calculates a second coupling compensation signal 216b based on the first motor current command $I_{d1}^*$, $I_{q1}^*$, and using a fourth set of gain factors. For example, the motor controller 70 may implement the second coupling compensation block 218b to determine the second coupling compensation signal 216b by applying the fourth set of gain factors to the first motor current command $I_{d1}^*$, $I_{q1}^*$.

At 510, the second method 500 determines a first final voltage command $\overline{V}_1^*$ based on the first feedforward control signal and the first coupling compensation signal 216a. For example, the motor controller 70 may implement the first addition block 208a to determine the first final voltage command $\overline{V}_1^*$ (i.e. the first winding voltage signal 106a) as a sum of the first feedforward control signal 212a and the first coupling compensation signal 216a.

At 512, the second method 500 determines a second final voltage command $\overline{V}_2^*$ based on the second feedforward control signal and the second coupling compensation signal. For example, the motor controller 70 may implement the second addition block 208b to determine the second final voltage command $\overline{V}_2^*$ (i.e. the second winding voltage signal 106b) as a sum of the second feedforward control signal 212b and the second coupling compensation signal 216b.

At 514, the second method 500 commands, based on the first final voltage command $\overline{V}_1^*$, a first inverter to apply a first output voltage $\overline{V}_1$ to the first winding set 62a and thereby causing a first output current $\overline{I}_1$ to be generated in the first winding set 62a. For example, the motor controller 70 may generate and supply the first final voltage command $\overline{V}_1^*$ to the first power converter 66a, thereby commanding the first inverter of the first power converter 66a to apply the first output voltage $\overline{V}_1$ to the first winding set 62a, thereby causing the first output current $\overline{I}_1$ to be generated in the first winding set 62a.

At 516, the second method 500 commands, based on the second final voltage command $\overline{V}_2^*$, a second inverter to apply a second output voltage $\overline{V}_2$ to the second winding set 62b and thereby causing a second output current $\overline{I}_2$ to be generated in the second winding set 62b. For example, the motor controller 70 may generate and supply the second final voltage command $\overline{V}_2^*$ to the second power converter 66b, thereby commanding the second inverter of the second power converter 66b to apply the second output voltage $\overline{V}_2$ to the second winding set 62b, thereby causing the second output current $\overline{I}_2$ to be generated in the second winding set 62b.

In some embodiments, the first output current $\overline{I}_1$ and the second output current $\overline{I}_2$ each have a d-axis component and a q-axis component, $I_{d1}$, $I_{q1}$, $I_{d2}$, $I_{q2}$, respectively, and at least one of the first set of gain factors and/or the second set of gain factors is configured to cause the d-axis component $I_{d1}$, and the q-axis component $I_{q1}$ of the first output current $\overline{I}_1$ to be decoupled from variations of the d-axis component $I_{d2}$ and the q-axis components $I_{q2}$ of the second output current $\overline{I}_2$. For example, one or more of the first or second sets of gain factors may cause the d-axis component $I_{d1}$, and the q-axis component $I_{q1}$ of the first output current $\overline{I}_1$ to be decoupled from variations of d-axis component $I_{d2}$ and the q-axis components $I_{q2}$ of the second output current $\overline{I}_2$.

In some embodiments, the at least one of the first set of gain factors and/or the second set of gain factors is further configured to cause the d-axis component $I_{d1}$ of the first output current $\overline{I}_1$ to be decoupled from variations of the q-axis component $I_{q1}$ of the first output current $\overline{I}_1$.

In some embodiments, the first final voltage command $\overline{V}_1^*$ and the second final voltage command $\overline{V}_2^*$ are each determined without any feedback signal based on a measured current in either of the first winding set 62a or the second winding set 62b.

In some embodiments, the second method 500 determines a BEMF compensation voltage 210a, 210b based on an estimated BEMF generated in at least one of the first winding set 62a and/or the second winding set 62b. For example, the motor controller 70 may implement the first BEMF compensation block 209a and/or the second BEMF compensation block 209b to determine the BEMF compensation voltage 210a, 210b. At least one of the first final voltage command $\overline{V}_1^*$ and/or the second final voltage command $\overline{V}_2^*$ may be further based on the BEMF compensation voltage 210a, 210b. For example, the motor controller 70 may also implement either or both of the addition blocks 208a, 208b to determine the corresponding one of the final voltage commands $\overline{V}_1^*$, $\overline{V}_2^*$ as a sum of the corresponding feedforward control signal 212a, 212b, the corresponding coupling compensation signal 216a, 216b, and the corresponding BEMF compensation voltage 210a, 210b.

In some embodiments, only one of the positive virtual half-motor final voltage command $\overline{V}_p^*$ and the negative virtual half-motor final voltage command $\overline{V}_n^*$ is further based on the BEMF compensation voltage 210a, 210b. For example, one of the first BEMF compensation block 209a or the second BEMF compensation block 209b may produce a zero-volt BEMF voltage, and the other one of the first BEMF compensation block 209a or the second BEMF compensation block 209b may produce the entirety of the BEMF compensation voltage for the dual wound motor 60.

In some embodiments, at least one of the third set of gain factors and/or the fourth set of gain factors includes at least one mutual inductance term, such as $\tilde{M}_d$ or $\tilde{M}_q$, and which represents a mutual inductance between the first winding set 62a and the second winding set 62b.

In some embodiments, a system for controlling a dual-wound synchronous machine includes a processor and a memory including instructions. When executed by the processor, the instructions cause the processor to: determine a positive virtual half-motor current command and a negative virtual half-motor current command based on a first motor current command associated with the first winding set and based on a second motor current command associated with the second winding set; calculate a positive virtual half-motor forward path voltage command based on the positive virtual half-motor current command and using a first set of gain factors; calculate a negative virtual half-motor forward path voltage command based on the negative virtual half-motor current command and using a second set of gain factors; determine a positive virtual half-motor final voltage command based on the positive virtual half-motor forward path voltage command; determine a negative virtual half-motor final voltage command based on the negative virtual half-motor forward path voltage command; determine a first final voltage command and a second final voltage command by applying a second mathematical transformation to the positive virtual half-motor final voltage command and the negative virtual half-motor final voltage command; command, based on the first final voltage command, a first inverter to apply a first output voltage to the first winding set and thereby causing a first output current to be generated in the first winding set; and command, based on the second final voltage command, a second inverter to apply a second output voltage to the second winding set and thereby causing a second output current to be generated in the second winding set. In some embodiments, the first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

In some embodiments, the at least one of the first set of gain factors and the second set of gain factors is further configured to cause the d-axis component of the first output current to be decoupled from variations of the q-axis component of the first output current.

In some embodiments, both of the first set of gain factors and the second set of gain factors together cause the d-axis component and the q-axis component of the first output current to be decoupled from variations of d-axis and q-axis components of the second output current.

In some embodiments, calculating the positive virtual half-motor forward path voltage command based on the positive virtual half-motor current command includes applying at least a portion of the first set of gain factors directly to the positive virtual half-motor current command.

In some embodiments, calculating the negative virtual half-motor forward path voltage command based on the negative virtual half-motor current command includes applying at least a portion of the first set of gain factors directly to the negative virtual half-motor current command.

In some embodiments, the instructions further cause the processor to calculate a back electromotive force (BEMF) compensation voltage based on an estimated BEMF of the positive virtual half-motor. In some embodiments, at least one of the positive virtual half-motor final voltage command and the negative virtual half-motor final voltage command is further based on the BEMF compensation voltage.

In some embodiments, only one of the positive virtual half-motor final voltage command and the negative virtual half-motor final voltage command is further based on the BEMF compensation voltage.

In some embodiments, a method of controlling a dual wound synchronous machine (DWSM) having a first winding set and a second winding set includes: determining a positive virtual half-motor current command and a negative virtual half-motor current command based on a first motor current command associated with the first winding set and based on a second motor current command associated with the second winding set; calculating a positive virtual half-motor forward path voltage command based on the positive virtual half-motor current command and using a first set of gain factors; calculating a negative virtual half-motor forward path voltage command based on the negative virtual half-motor current command and using a second set of gain factors; determining a positive virtual half-motor final voltage command based on the positive virtual half-motor forward path voltage command; determining a negative virtual half-motor final voltage command based on the negative virtual half-motor forward path voltage command; determining a first final voltage command and a second final voltage command by applying a second mathematical transformation to the positive virtual half-motor final voltage command and the negative virtual half-motor final voltage command; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. In some embodiments, the first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

In some embodiments, the at least one of the first set of gain factors and the second set of gain factors is further configured to cause the d-axis component of the first output current to be decoupled from variations of the q-axis component of the first output current.

In some embodiments, both of the first set of gain factors and the second set of gain factors together cause the d-axis component and the q-axis component of the first output current to be decoupled from variations of d-axis and q-axis components of the second output current.

In some embodiments, calculating the positive virtual half-motor forward path voltage command based on the positive virtual half-motor current command includes applying at least a portion of the first set of gain factors directly to the positive virtual half-motor current command.

In some embodiments, calculating the negative virtual half-motor forward path voltage command based on the negative virtual half-motor current command includes applying at least a portion of the first set of gain factors directly to the negative virtual half-motor current command.

In some embodiments, the method further includes calculating a back electromotive force (BEMF) compensation voltage based on an estimated BEMF of the positive virtual half-motor. In some embodiments, at least one of the positive virtual half-motor final voltage command and the negative virtual half-motor final voltage command is further based on the BEMF compensation voltage.

In some embodiments, only one of the positive virtual half-motor final voltage command and the negative virtual half-motor final voltage command is further based on the BEMF compensation voltage.

In some embodiments, a method of controlling a dual wound synchronous machine (DWSM) having a first winding set and a second winding set includes: calculating a first feedforward control signal based on a first motor current command associated with the first winding set and using a first set of gain factors; calculating a second feedforward control signal based on a second motor current command associated with the second winding set and using a second set of gain factors; calculating a first coupling compensation signal based on the second motor current command and using a third set of gain factors; calculating a second coupling compensation signal based on the first motor current command and using a fourth set of gain factors; determining a first final voltage command based on the first feedforward control signal and the first coupling compensation signal; determining a second final voltage command based on the second feedforward control signal and the second coupling compensation signal; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. In some embodiments, the first output current and the second output current each have a d-axis component and a q-axis component, and at least one of the third set of gain factors and the fourth set of gain factors is configured to cause the d-axis component and the q-axis component of the first output current to be decoupled from variations of d-axis and q-axis components of the second output current.

In some embodiments, at least one of the first set of gain factors and the second set of gain factors is configured to cause the d-axis component of the first output current to be decoupled from variations of the q-axis component of the first output current.

In some embodiments, the first final voltage command and the second final voltage command are each determined without any feedback signal based on a measured current in either of the first winding set or the second winding set.

In some embodiments, the method further includes: determining a back electromotive force (BEMF) compensation voltage based on an estimated BEMF generated in at least one of the first winding set and the second winding set. In some embodiments, at least one of the first final voltage command and the second final voltage command is further based on the BEMF compensation voltage.

In some embodiments, only one of the first final voltage command and the second final voltage command is based on the BEMF compensation voltage.

In some embodiments, at least one of the third set of gain factors and the fourth set of gain factors includes at least one mutual inductance term representing a mutual inductance between the first winding set and the second winding set.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or com-

Having thus described the invention, it is claimed:

1. A system for controlling a dual wound synchronous machine (DWSM) having a first winding set and a second winding set, the system comprising:
   a processor and a memory including instructions that, when executed by the processor, cause the processor to:
      determine a positive virtual half-motor current command and a negative virtual half-motor current command based on a first motor current command associated with the first winding set and based on a second motor current command associated with the second winding set;
      calculate a positive virtual half-motor forward path voltage command based on the positive virtual half-motor current command and using a first set of gain factors;
      calculate a negative virtual half-motor forward path voltage command based on the negative virtual half-motor current command and using a second set of gain factors;
      determine a positive virtual half-motor final voltage command based on the positive virtual half-motor forward path voltage command;
      determine a negative virtual half-motor final voltage command based on the negative virtual half-motor forward path voltage command;
      determine a first final voltage command and a second final voltage command by applying a second mathematical transformation to the positive virtual half-motor final voltage command and the negative virtual half-motor final voltage command;
      command, based on the first final voltage command, a first inverter to apply a first output voltage to the first winding set and thereby causing a first output current to be generated in the first winding set; and
      command, based on the second final voltage command, a second inverter to apply a second output voltage to the second winding set and thereby causing a second output current to be generated in the second winding set,
   wherein the first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

2. The system of claim 1, wherein the at least one of the first set of gain factors and the second set of gain factors is further configured to cause the d-axis component of the first output current to be decoupled from variations of the q-axis component of the first output current.

3. The system of claim 1, wherein both of the first set of gain factors and the second set of gain factors together cause the d-axis component and the q-axis component of the first output current to be decoupled from variations of d-axis and q-axis components of the second output current.

4. The system of claim 1, wherein calculating the positive virtual half-motor forward path voltage command based on the positive virtual half-motor current command includes applying at least a portion of the first set of gain factors directly to the positive virtual half-motor current command.

5. The system of claim 1, wherein calculating the negative virtual half-motor forward path voltage command based on the negative virtual half-motor current command includes applying at least a portion of the first set of gain factors directly to the negative virtual half-motor current command.

6. The system of claim 1, wherein the instructions further cause the processor to calculate a back electromotive force (BEMF) compensation voltage based on an estimated BEMF of the positive virtual half-motor, and
   wherein at least one of the positive virtual half-motor final voltage command and the negative virtual half-motor final voltage command is further based on the BEMF compensation voltage.

7. The system of claim 6, wherein only one of the positive virtual half-motor final voltage command and the negative virtual half-motor final voltage command is further based on the BEMF compensation voltage.

8. A method of controlling a dual wound synchronous machine (DWSM) having a first winding set and a second winding set, the method comprising:
   determining a positive virtual half-motor current command and a negative virtual half-motor current command based on a first motor current command associated with the first winding set and based on a second motor current command associated with the second winding set;
   calculating a positive virtual half-motor forward path voltage command based on the positive virtual half-motor current command and using a first set of gain factors;
   calculating a negative virtual half-motor forward path voltage command based on the negative virtual half-motor current command and using a second set of gain factors;
   determining a positive virtual half-motor final voltage command based on the positive virtual half-motor forward path voltage command;
   determining a negative virtual half-motor final voltage command based on the negative virtual half-motor forward path voltage command;
   determining a first final voltage command and a second final voltage command by applying a second mathematical transformation to the positive virtual half-motor final voltage command and the negative virtual half-motor final voltage command;
   commanding, based on the first final voltage command, a first inverter to apply a first output voltage to the first winding set and thereby causing a first output current to be generated in the first winding set; and
   commanding, based on the second final voltage command, a second inverter to apply a second output voltage to the second winding set and thereby causing a second output current to be generated in the second winding set, wherein the first output current and the second output current each have a d-axis component and a q-axis component, and at least one of the first set of gain factors and the second set of gain factors is configured to cause the d-axis component and the q-axis component of the first output current to be decoupled from variations of d-axis and q-axis components of the second output current.

9. The method of claim 8, wherein the at least one of the first set of gain factors and the second set of gain factors is further configured to cause the d-axis component of the first output current to be decoupled from variations of the q-axis component of the first output current.

10. The method of claim 8, wherein both of the first set of gain factors and the second set of gain factors together cause the d-axis component and the q-axis component of the first output current to be decoupled from variations of d-axis and q-axis components of the second output current.

11. The method of claim 8, wherein calculating the positive virtual half-motor forward path voltage command based on the positive virtual half-motor current command includes applying at least a portion of the first set of gain factors directly to the positive virtual half-motor current command.

12. The method of claim 8, wherein calculating the negative virtual half-motor forward path voltage command based on the negative virtual half-motor current command includes applying at least a portion of the first set of gain factors directly to the negative virtual half-motor current command.

13. The method of claim 8, further comprising calculating a back electromotive force (BEMF) compensation voltage based on an estimated BEMF of the positive virtual half-motor, and wherein at least one of the positive virtual half-motor final voltage command and the negative virtual half-motor final voltage command is further based on the BEMF compensation voltage.

14. The method of claim 13, wherein only one of the positive virtual half-motor final voltage command and the negative virtual half-motor final voltage command is further based on the BEMF compensation voltage.

15. A method of controlling a dual wound synchronous machine (DWSM) having a first winding set and a second winding set, the method comprising:

calculating a first feedforward control signal based on a first motor current command associated with the first winding set and using a first set of gain factors;

calculating a second feedforward control signal based on a second motor current command associated with the second winding set and using a second set of gain factors;

calculating a first coupling compensation signal based on the second motor current command and using a third set of gain factors;

calculating a second coupling compensation signal based on the first motor current command and using a fourth set of gain factors;

determining a first final voltage command based on the first feedforward control signal and the first coupling compensation signal;

determining a second final voltage command based on the second feedforward control signal and the second coupling compensation signal;

commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set, wherein the first output current and the second output current each have a d-axis component and a q-axis component, and at least one of the third set of gain factors and the fourth set of gain factors is configured to cause the d-axis component and the q-axis component of the first output current to be decoupled from variations of d-axis and q-axis components of the second output current.

16. The method of claim 15, wherein at least one of the first set of gain factors and the second set of gain factors is configured to cause the d-axis component of the first output current to be decoupled from variations of the q-axis component of the first output current.

17. The method of claim 15, wherein the first final voltage command and the second final voltage command are each determined without any feedback signal based on a measured current in either of the first winding set or the second winding set.

18. The method of claim 15, further comprising: determining a back electromotive force (BEMF) compensation voltage based on an estimated BEMF generated in at least one of the first winding set and the second winding set, and wherein at least one of the first final voltage command and the second final voltage command is further based on the BEMF compensation voltage.

19. The method of claim 18, wherein only one of the first final voltage command and the second final voltage command is based on the BEMF compensation voltage.

20. The method of claim 15, wherein at least one of the third set of gain factors and the fourth set of gain factors includes at least one mutual inductance term representing a mutual inductance between the first winding set and the second winding set.

* * * * *